(12) United States Patent
Mandel et al.

(10) Patent No.: US 11,599,589 B2
(45) Date of Patent: Mar. 7, 2023

(54) BULLETIN BOARD DATA MAPPING AND PRESENTATION

(71) Applicant: Bitvore Corporation, Dover, DE (US)

(72) Inventors: Carl Herman Mandel, Toronto (CA); David Mandel, Toronto (CA); Brian Fudge, Del Mar, CA (US); Lew Roth, Santa Monica, CA (US); Kevin Watters, Allston, MA (US)

(73) Assignee: Bitvore Corp., Los Angeles, CA (US)

( * ) Notice: Subject to any disclaimer, the term of this patent is extended or adjusted under 35 U.S.C. 154(b) by 0 days.

(21) Appl. No.: 14/678,762

(22) Filed: Apr. 3, 2015

(65) Prior Publication Data

US 2015/0347596 A1     Dec. 3, 2015

Related U.S. Application Data

(63) Continuation of application No. 13/214,053, filed on Aug. 19, 2011, now Pat. No. 9,015,244.

(Continued)

(51) Int. Cl.
*G06F 16/9535* (2019.01)
*G06F 16/248* (2019.01)
(Continued)

(52) U.S. Cl.
CPC ...... *G06F 16/9535* (2019.01); *G06F 16/2228* (2019.01); *G06F 16/2365* (2019.01);
(Continued)

(58) Field of Classification Search
CPC ......... G06F 17/30867; G06F 17/30371; G06F 17/3053; G06F 17/30554; G06F 17/30321
(Continued)

(56) References Cited

U.S. PATENT DOCUMENTS 6,212,521 B1 *   4/2001   Minami ............ G06F 17/30949
                                                                   707/613
7,159,011 B1    1/2007   Knight et al.
(Continued)

FOREIGN PATENT DOCUMENTS

AU    2008254644    *   5/2008   ............. G06F 17/30

OTHER PUBLICATIONS

PCT International Search Report and Written Opinion in International application No. PCT/US11/48512 dated Jan. 5, 2012 (5 pgs).
(Continued)

*Primary Examiner* — David R Lazaro
*Assistant Examiner* — Mariegeorges A Henry
(74) *Attorney, Agent, or Firm* — McAndrews, Held & Malloy, Ltd.

(57) ABSTRACT

The system provides a method and apparatus for sorting and displaying information from a BBS. The system provides a method of sorting and presenting messages from a BBS in a way so that the relationship in message threads can be easily observed and related messages can be identified. The system provides a way to view messages and map message threads in two and three dimensions so that the content of messages can be easily reviewed and the relationship between messages can be seen and followed. The system allows a user to enter into a message thread at any point and to then produce a visualization of the related threads and messages associated with each individual message. The system provides interfaces for either a linear or threaded BBS or even a hybrid BBS that is some combination of linear and threaded.

9 Claims, 27 Drawing Sheets

Related U.S. Application Data

(60) Provisional application No. 61/375,414, filed on Aug. 20, 2010.

(51) Int. Cl.
  *G06F 16/22* (2019.01)
  *G06F 16/23* (2019.01)
  *G06F 16/2457* (2019.01)
  *H04L 51/216* (2022.01)
  *G06Q 10/10* (2012.01)
  *G06Q 10/107* (2023.01)

(52) U.S. Cl.
  CPC ...... *G06F 16/248* (2019.01); *G06F 16/24578* (2019.01); *G06Q 10/107* (2013.01); *H04L 51/216* (2022.05)

(58) Field of Classification Search
  USPC .......................................................... 709/204
  See application file for complete search history.

(56) References Cited

U.S. PATENT DOCUMENTS

| | | | | |
|---|---|---|---|---|
| 7,698,270 | B2 * | 4/2010 | Brave | G06F 16/9535 |
| | | | | 707/603 |
| 7,917,483 | B2 * | 3/2011 | Chang | G06F 16/9535 |
| | | | | 707/705 |
| 8,176,044 | B2 * | 5/2012 | Edala | G06F 16/9535 |
| | | | | 707/723 |
| 8,429,220 | B2 * | 4/2013 | Wilkinson | G06F 17/30545 |
| | | | | 709/201 |
| 8,489,641 | B1 * | 7/2013 | Seefeld | G06F 16/248 |
| | | | | 707/792 |
| 2004/0061716 | A1 | 4/2004 | Cheung et al. | |
| 2005/0055405 | A1 | 3/2005 | Kaminsky et al. | |
| 2006/0149606 | A1 | 7/2006 | Goan et al. | |
| 2006/0259481 | A1 * | 11/2006 | Handley | G06F 16/355 |
| 2007/0005587 | A1 * | 1/2007 | Johnson | G06F 16/24578 |
| 2007/0022169 | A1 | 1/2007 | Suzuki et al. | |
| 2008/0126308 | A1 * | 5/2008 | Wooldridge | G06F 16/951 |
| | | | | 713/502 |
| 2009/0049038 | A1 | 2/2009 | Gross | |
| 2009/0125498 | A1 * | 5/2009 | Cao | G06F 17/30864 |
| 2009/0235084 | A1 | 9/2009 | Ferraro et al. | |
| 2009/0240680 | A1 * | 9/2009 | Tankovich | G06F 16/24578 |
| 2009/0292696 | A1 * | 11/2009 | Shuster | G06F 17/30867 |
| 2010/0005087 | A1 | 1/2010 | Basco et al. | |
| 2010/0070880 | A1 | 3/2010 | Chinta | |
| 2010/0174710 | A1 * | 7/2010 | Carson, Jr. | G06Q 30/02 |
| | | | | 707/728 |
| 2010/0220008 | A1 * | 9/2010 | Conover | G01S 1/245 |
| | | | | 342/357.29 |
| 2010/0281113 | A1 | 11/2010 | Laine et al. | |

OTHER PUBLICATIONS

PCT International Preliminary Report on Patentability in International application No. PCT/US11/48512 dated Mar. 7, 2013 (4 pgs).

* cited by examiner

DCS Corp.
2-D GUI / vBulletin / Single Thread (no sub-threads)

| | dare777 | Jaydo06 | AmmsAcad |
|---|---|---|---|
| 05-20-2010 | Straight kicks to the ... 05-20-2010, 08:43 AM<br>Straight kicks to the Knee ...<br>dare777 | | |
| | Re: Straight kicks to ... 05-20-2010, 10:37 AM<br>It's a very whimp ass move ...<br>joeyP | | |
| | Re: Straight kicks to ... 05-20-2010, 12:54 AM<br>yes they should be banned ...<br>IceCold48 | | |
| | Re: Straight kicks to ... 05-20-2010, 02:38 PM<br>2 replies on a topic about a ...<br>dare777 | | |
| | Re: Straight kicks to ... 05-20-2010, 02:47 PM<br>I was wondering the same ...<br>trustkill | 107 | |
| 05-21-2010 | Re: Straight kicks to ... 05-21-2010, 01:46 PM<br>I'm still surprised that this ...<br>Jaydo06 | Re: Straight kicks to ... 05-21-2010, 01:46 PM<br>I'm still surprised that this ...<br>Jaydo06 | |
| | Re: Straight kicks to ... 05-21-2010, 01:56 PM<br>I agree. I don't see the ...<br>likebutta | Re: Straight kicks to ... 05-21-2010, 01:56 PM<br>I agree. I don't see the ...<br>likebutta | |
| | Re: Straight kicks to ... 05-21-2010, 02:43 PM<br>It's just plain too dangerous ...<br>Jaydo06 | Re: Straight kicks to ... 05-21-2010, 02:43 PM<br>It's just plain too dangerous ...<br>Jaydo06 | |
| 05-23-2010 | Re: Straight kicks to ... 05-23-2010, 03:12 PM<br>I think it shouldnt be used ...<br>AmmsAcad | Re: Straight kicks to ... 05-23-2010, 03:12 PM<br>I think it shouldnt be used ...<br>AmmsAcad | Re: Straight kicks to ... 05-23-2010, 03:12 PM<br>I think it shouldnt be used ...<br>AmmsAcad |
| | Re: Straight kicks to ... 05-23-2010, 03:12 PM<br>Honestly I don't see anything ...<br>stpierrecanada | Re: Straight kicks to ... 05-23-2010, 03:12 PM<br>Honestly I don't see anything ...<br>stpierrecanada | Re: Straight kicks to ... 05-23-2010, 03:12 PM<br>Honestly I don't see anything ...<br>stpierrecanada |

```
|0    |2    |4    |6    |8    |10   |12   |14   |16   |18
``` dare777  Straight kicks to the Knee    05-20-2010, 08:43 AM
  ▫ joeyP  *It's a very whimp ass move...*  05-20-2010, 10:37 AM
  ▫ IceCold48  *yes they should be banned...*  05-20-2010, 12:54 PM
  ▫ dare777  *2 replies on a topic about a...*  05-20-2010, 02:38 PM
  ▫ trustkill  *I was wondering the same...*  05-20-2010, 02:47 PM
  ▫ Jaydo06  *I'm still surprised that this...*  05-21-2010, 01:46 PM
    ▫ likebutta  *I agree. I don't see the...*  05-21-2010, 02:56 PM
      ▫ Jaydo06  *It's just plain too dangerous...*  05-21-2010, 02:43 PM
  ▫ AmmsAcad  *I think it shouldnt be used...*  05-23-2010, 03:12 PM
  ▫ stpierrecanada  *Honestly I don't see anything...*  05-23-2010, 07:51 PM
    ▫ AmmsAcad  *I guess what I really mean is...*  05-24-2010, 07:20 PM
    ▫ Jaydo06  *Only difference is that you...*  05-27-2010, 01:29 PM
  ▫ Schlinks  *I never really like seeing...*  05-24-2010, 03:32 AM
  ▫ Frasedog  *I personally think they...*  05-24-2010, 01:00 PM
    ▫ mattc25  *...great post. My thoughts...*  05-24-2010, 08:53 PM
  ▫ mma#1fan  *don't plant your lead leg and...*  05-25-2010, 09:00 AM
    ▫ dbader08  *I think they should be...*  05-25-2010, 07:20 PM
      ▫ Schlinks  *I don't think the reasoning...*  05-26-2010, 01:00 AM
      ▫ dare777  *I hear what you are saying...*  05-26-2010, 09:48 AM
  ▫ dare777  *I am on the fence now. I have...*  05-26-2010, 09:45 AM
  ▫ beau420  *If you watch K-1 they always...*  05-27-2010, 02:49 PM

Figure 8

BULLETIN BOARD DATA MAPPING AND PRESENTATION

This application is a Continuation of Ser. No. 13/214,053 filed on Aug. 19, 2011, which claims priority to U.S. Provisional 61/375,414 filed Aug. 20, 2010 which is incorporated by reference herein in its entirety.

BACKGROUND OF THE SYSTEM

Electronic communication has become an indispensable business and personal tool. Applications such as email, instant messaging, SMS texting, Twitter, social networking sites, Bulletin Boards, Collaboration Software, and the like have become ubiquitous and are used extensively in lieu of, or in combination with, more conventional communications methods such as postal mail, telephone communication, and in person meetings.

As electronic communication has supplemented and replaced prior communication techniques its importance as evidence in transactions has grown. Particularly in litigation, due in part to the impact of Sarbanes-Oxley and other corporate governance requirements, the preservation and production of email is required in every jurisdiction.

The Federal Rules of Civil Procedure have been expanded to cover electronically stored information (ESI) including emails and other types of electronic communication. This type of information must be preserved and produced in a controversy as well as in the normal course of corporate governance. A difficulty in producing electronic communications is the need to produce all the electronic communications required and only the electronic communications that are required of a party to produce. Failure to produce all requested electronic communications can result in potential loss of rights and/or penalties from governing bodies such as the SEC, Producing more electronic communications than are required can breach confidentiality and put a litigant or company in the position of revealing data that would otherwise have remained confidential.

One type of electronic communication system in use are bulletin board systems (BBS). A BBS is a computer program that allows users and guests (Collectively "posters") to log in and participate in a number of operations, including the posting of messages related to some particular subject. Often a BBS is a special interest destination that deals with a particular subject. For example, there are BBS's for nearly all makes and models of vehicles, audio systems, consumer products, movies, television shows, performers, musicians, and the like. A BBS may be ran by an individual or group, or even by a corporate sponsor or other commercial enterprise.

A BBS poster may be a registered users or a guest. Often there are tiers of users, with guests having the fewest privileges, posters who register for free having more privileges, and posters who elect to pay for membership (if offered) enjoying the most privileges.

Posters typically register under an avatar or pseudonym, although such is not typically required. However, the anonymity of a pseudonym seems to be desired by most registrants. Typically, the registrant associates their account with a particular email address, which itself may be pseudonymous.

A BBS may define a hierarchy of folders that define topics and areas of discussion. Individual messages and communications within a folder or topic are referred to herein as "postings". A group of related postings is referred to as a "thread". In some cases, a poster can initiate a new folder where all replies to the initial posting are found within that folder. In some cases, new threads can only be created at certain points in the folder hierarchy, and at the lowest level, for example, only replies can be posted and no new threads can be created.

A BBS may have icons or buttons such as "New Topic" or "New Thread" which will create a new discrete folder or thread, Within a thread, the poster may only be presented with "Post Reply". In some instances, only an administrator or moderator can create a new thread or topic.

A BBS is often organized in one of two ways. One way is a "linear mode" BBS where there is no threading and sub-threading. The other way is a "threaded mode" BBS where there are threads and one or more hierarchical levels of sub-threads.

In the current art, there is not a good solution for the culling, sorting, inspection, and analysis of postings and the relationship among Posters.

BRIEF SUMMARY OF THE SYSTEM

The system provides a method and apparatus for sorting and displaying information from a BBS. The system provides a method of sorting and presenting messages from a BBS in a way so that the content of postings can be analysed and tracked, possible and/or existing relationship(s) between posters can be deduced, and the relationship in message threads can be easily observed and related messages can be identified. The system provides a way to view messages, map message threads, and view possible and/or existing relationships between poster in two and three dimensions so that the content of messages can be easily reviewed and the relationship between messages can be seen and followed. The system allows a user to enter into an message thread at any point and to then produce a visualization of the related threads and messages associated with each individual message. A unique tool allows the navigation of BBS databases with ease. The system provides interfaces for a linear BBS, a threaded BBS, or even a hybrid BBS that is some combination of linear and threaded.

BRIEF DESCRIPTION OF THE DRAWINGS

FIGS. 1B-1K are magnified portions of FIG. 1A.

FIG. 2 is an example of the sort by feature of an embodiment of the system.

FIG. 8 is an example of threaded bulletin board messages.

DETAILED DESCRIPTION OF THE SYSTEM

The system allows the mapping, collection, filtering, and display of messages from a data source such as a BBS or any other type of message system, including from social media networks, twitter, user groups, and the like. The following example relates to embodiments using one or BBS environments, but the system has equal application to other messaging environments.

Figure 11:
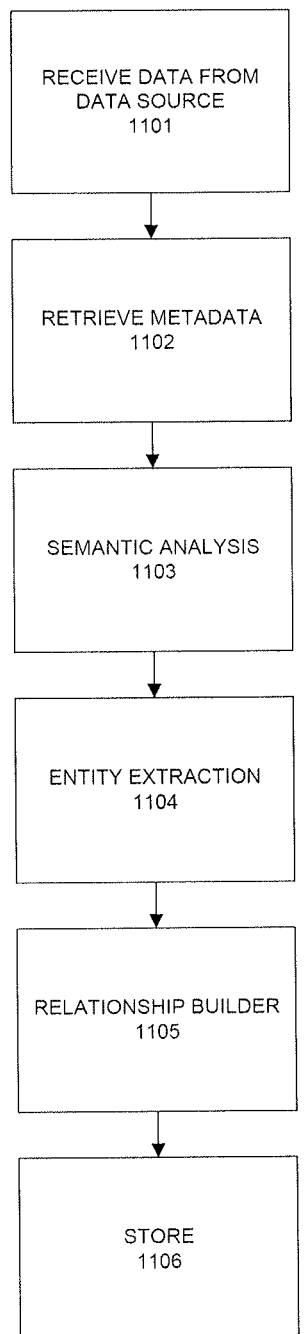
FIG. 11 is a flow diagram illustrating an embodiment of the operation of the system.

As noted above, a BBS can be configured in linear, non-linear, or hybrid structures. In operation, the system has access to a database of the messages at one or more bulletin boards. The system downloads and sorts the messages, collects meta data, and normalizes the data for use by the system. An example of the operation of an embodiment of the system is illustrated in the flow diagram of FIG. 11.

At step 1101 the system receives data from a data source. The data source could be a linear or nonlinear BBS, text messaging system, social media network, email, and/or other communication systems. At step 1102 the system retrieves any metadata associated with the source data. This can include sender, recipient, date, attachment information, and other metadata associated with each communication.

At step 1103 the system performs a semantic analysis on the data to provide more filtering information and to aid in identifying related messages. This can include attempting to identify related subject lines, copied message data in replies and forwards, and other information. The semantic analysis also aids in building an index into the data.

At step 1104 the system performs an entity extraction to identify senders and recipients and to associate those parties with any other accounts that may be pseudonyms of the party. This may be accomplished by IP address matching, semantic analysis, known aliases, or data from other sources, such as social network pages.

At step 1105 the system builds the relationships between the messages so that related messages can be more easily identified. The system includes its own metadata establishing relationships between participants and messages so that effective sorting, filtering, and querying can be accomplished. Finally, at step 1106, the system can store the normalized and reconfigured data, as well as the original source data, in a local data store for future access. In one embodiment, the storage step includes de-duplicating the messages to remove duplicates.

Figure 12:
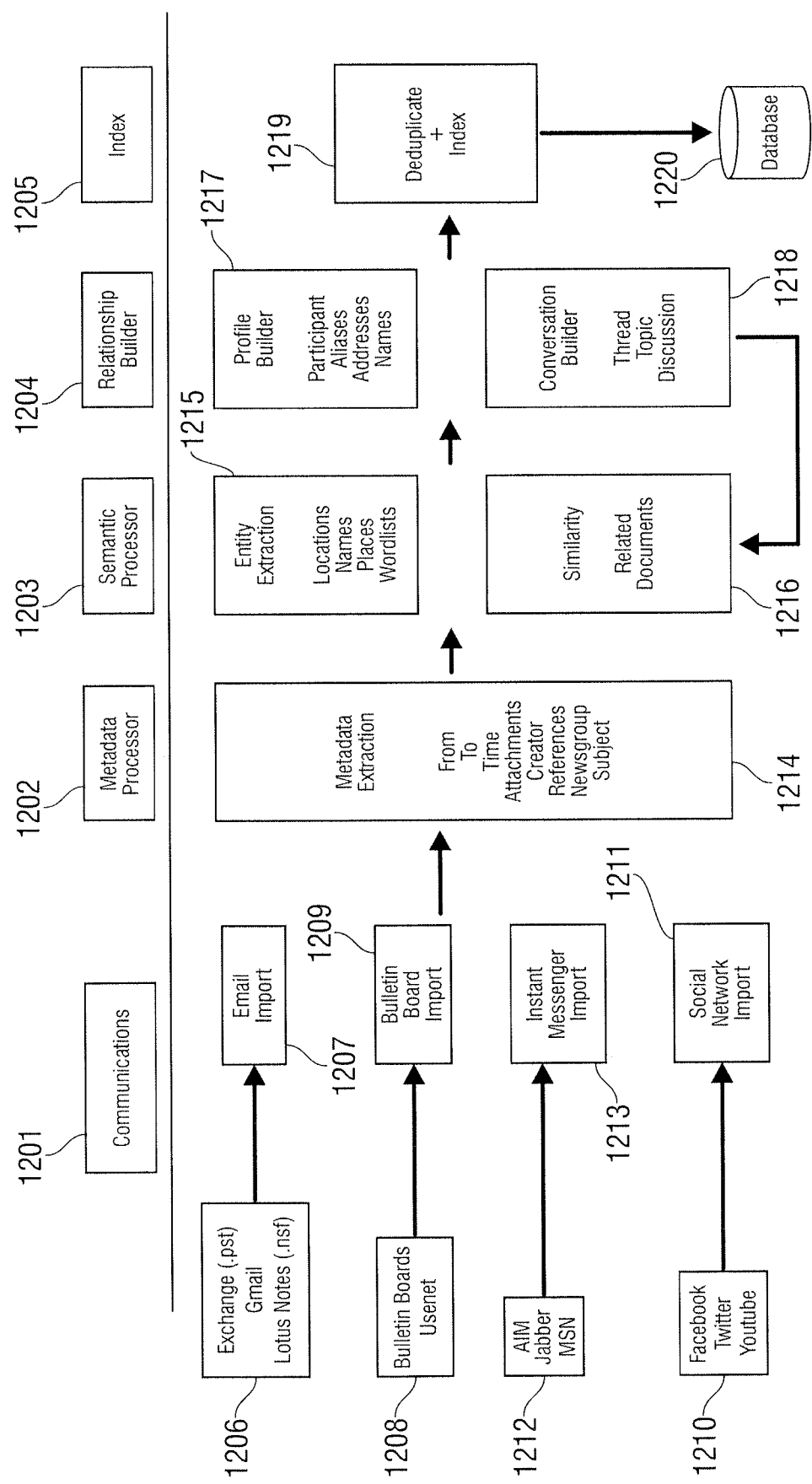
FIG. 12 is a block diagram illustrating an embodiment of the system.

An example of a hardware embodiment for sorting messages from a plurality of sources is illustrated in FIG. 12, The system operates in a plurality of stages. Stage 1201 is the communications stage. Stage 1202 is a metadata processing stage and is followed by a semantic processing stage 1203. The system includes a relationship building stage 1204 and indexing stage 1205.

The communication stage 1201 is where raw data is collected for importation to the rest of the system. The communication stage may take data from a plurality of sources, such as email 1206 through email importer 1207, BBS information 1208 via bulletin board importer 1209, social media data 1210 via social media importer 1211, and message data 1212 through instant messenger importer 1213.

Email data 1206 may be from any of one or more email system and may be in formats such as .pst files, Gmail files, .nsf (Lotus Notes) files, and the like. The email is imported with any attachments that may be associated with the emails. Bulletin board data 1208 may be messages or postings from web based bulletin boards and may come from linear or threaded (and sub-threaded) BBS sources (e.g. usenet) using bulletin board engines such as, for example, vBulletin. Bulletin board messages or postings are imported with any attachments or imbedded media such as video clips, photos, links, audio clips.

Social media data 1210 may include Twitter postings, Facebook wall postings or any other message based communications on social media, such as comments to videos or blogs and associated comments. Social Media messages or postings are imported with any attachments or imbedded media such as video clips, photos, audio clips, links, etc.

Messenger data 1212 includes AIM, SMS, Jabber, MSN, Blackberry Messenger, or any other instant message systems. Messenger messages are imported with any attachments or imbedded media such as video clips, photos, audio clips, links, etc.

Communications from each of these sources may be processed as a batch, or in a continuous manner as data arrives from each source, such as live monitoring of communications. Communications may also arrive multiple times or out-of-order, as they are placed in order and de-duplicated by the indexing engine 1219.

The semantic processing stage 1203 comprises an entity extractor 1215 and a similarity engine 1216. The entity extractor 1215 determines locations, names, places and other noun-phrase concepts which may be optionally guided by a user defined wordlist, related to each message or communication. The similarity engine 1216 uses the concepts identified by the entity extractor to identify related documents. This process conducts a search for other documents that have locations, names, places, or other noun-phrase concepts similar to the document being ingested. If the number of matching concepts exceeds a threshold the documents will be identified as similar, for use in later processing steps.

The relationship builder stage 1204 includes a profile builder 1217 and a conversation builder 1218. The profile builder 1217 identifies participants and any aliases, addresses, names, related accounts or user names, and other identifying information to identify a participant as well as possible regardless of the account that is being used. The conversation builder 1218 analyzes documents to determine if they are part of a new or existing communications thread. The conversation builder uses the output of the similarity engine 1216 and the techniques described in 86-106. This process incorporates a feedback loop so that each new document added to a thread helps to identify additional candidate documents. The conversation builder 1218 is helpful when responding to discovery requests by allowing appropriate responses to be identified even if the communications do not share a common subject line, thread, or topic.

The indexing stage 1205 includes an indexing engine 1219 to eliminate duplicates and to annotate and index each message. The indexed and processed communications and messages are stored in database 1220 for later retrieval and display, Linear BBS As noted above, a linear BBS presents messages in order of posting with no fixed relationship between one message and another. A user might discern a relationship by the subject line used by subsequent posters, but such replies and/or related messages may be separated by a plurality of other unrelated messages.

Figure 1A:
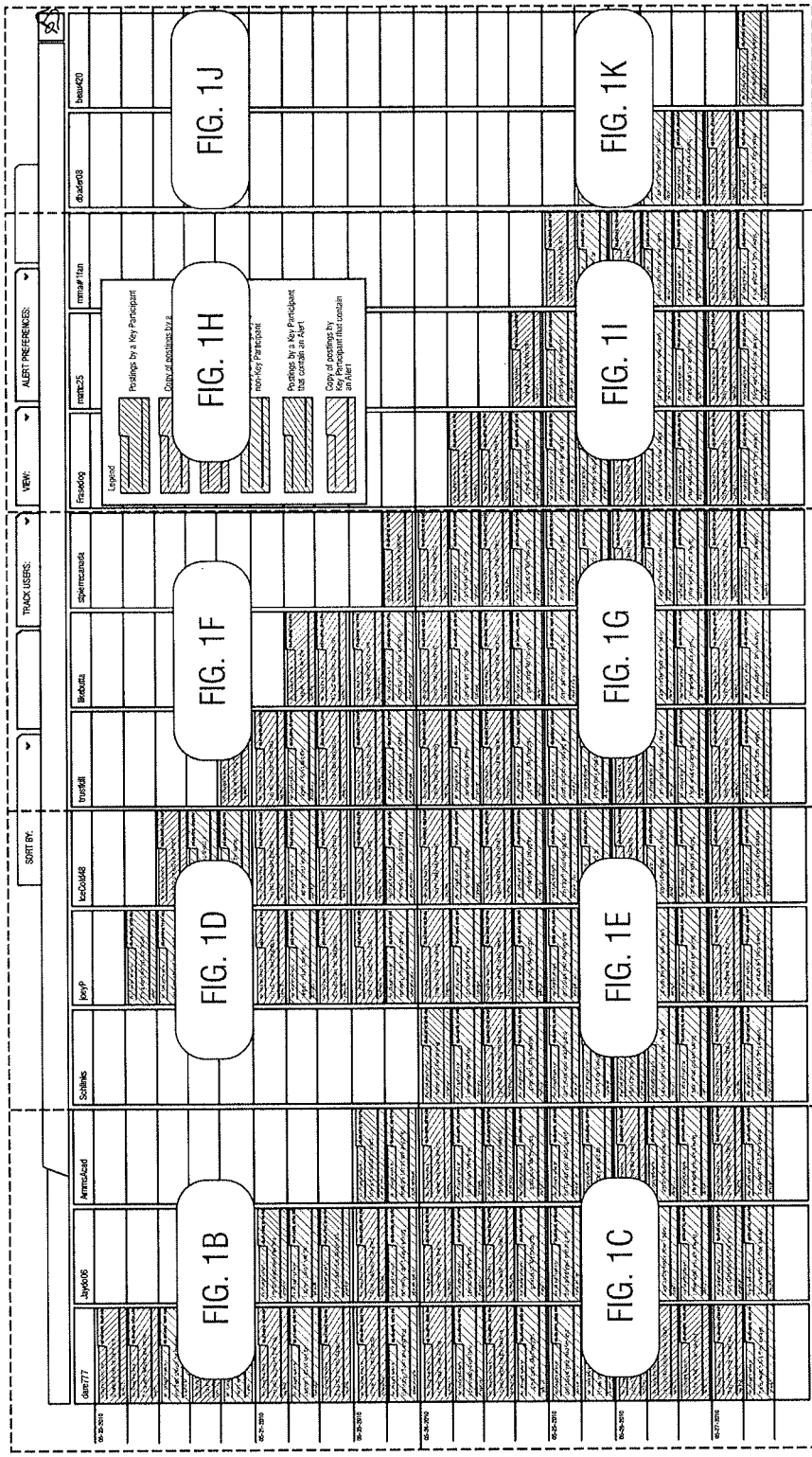
FIG. 1A is an example of a sorted presentation of messages from a linear BBS.
Figure 1C:
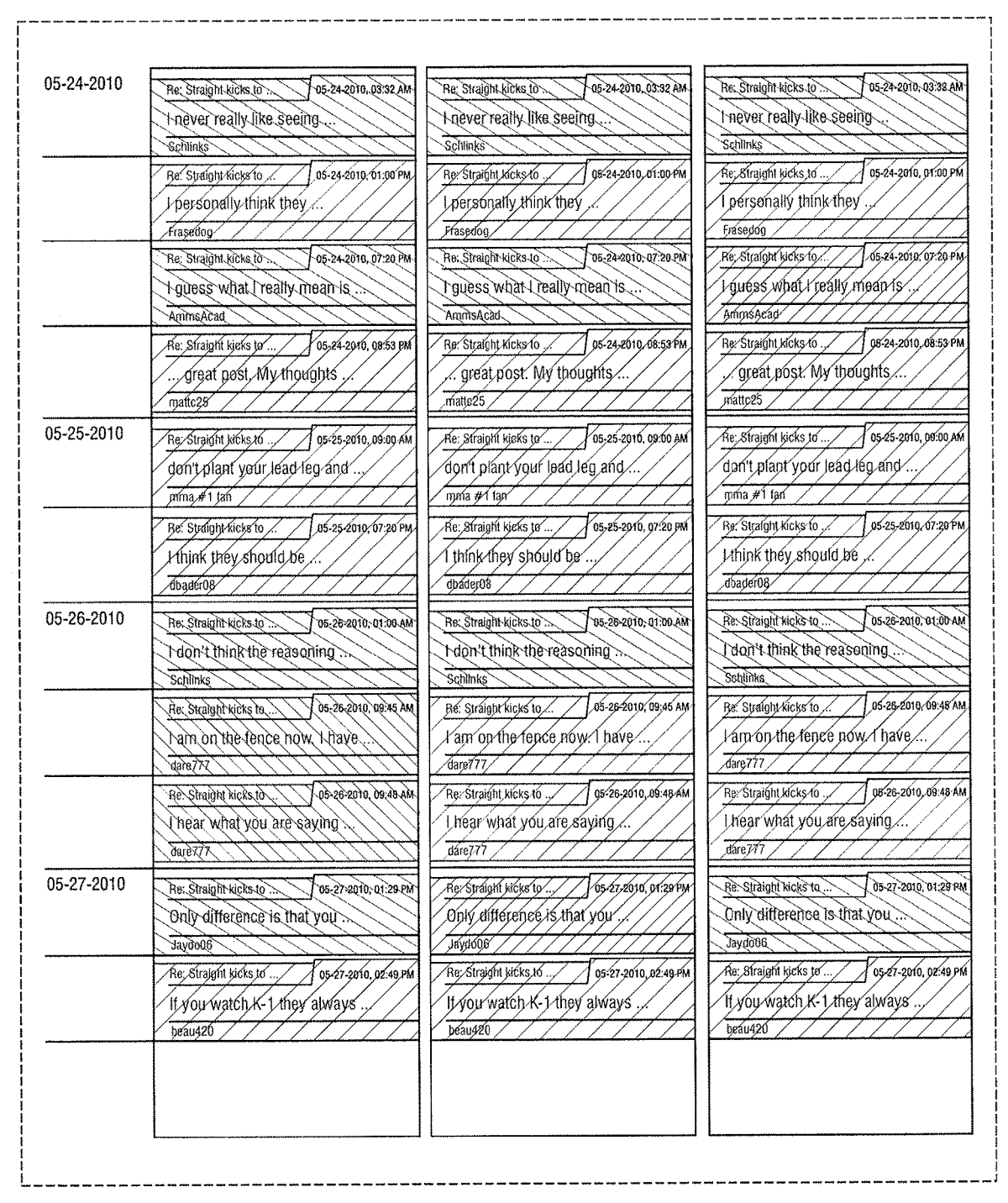
Figure 1D:
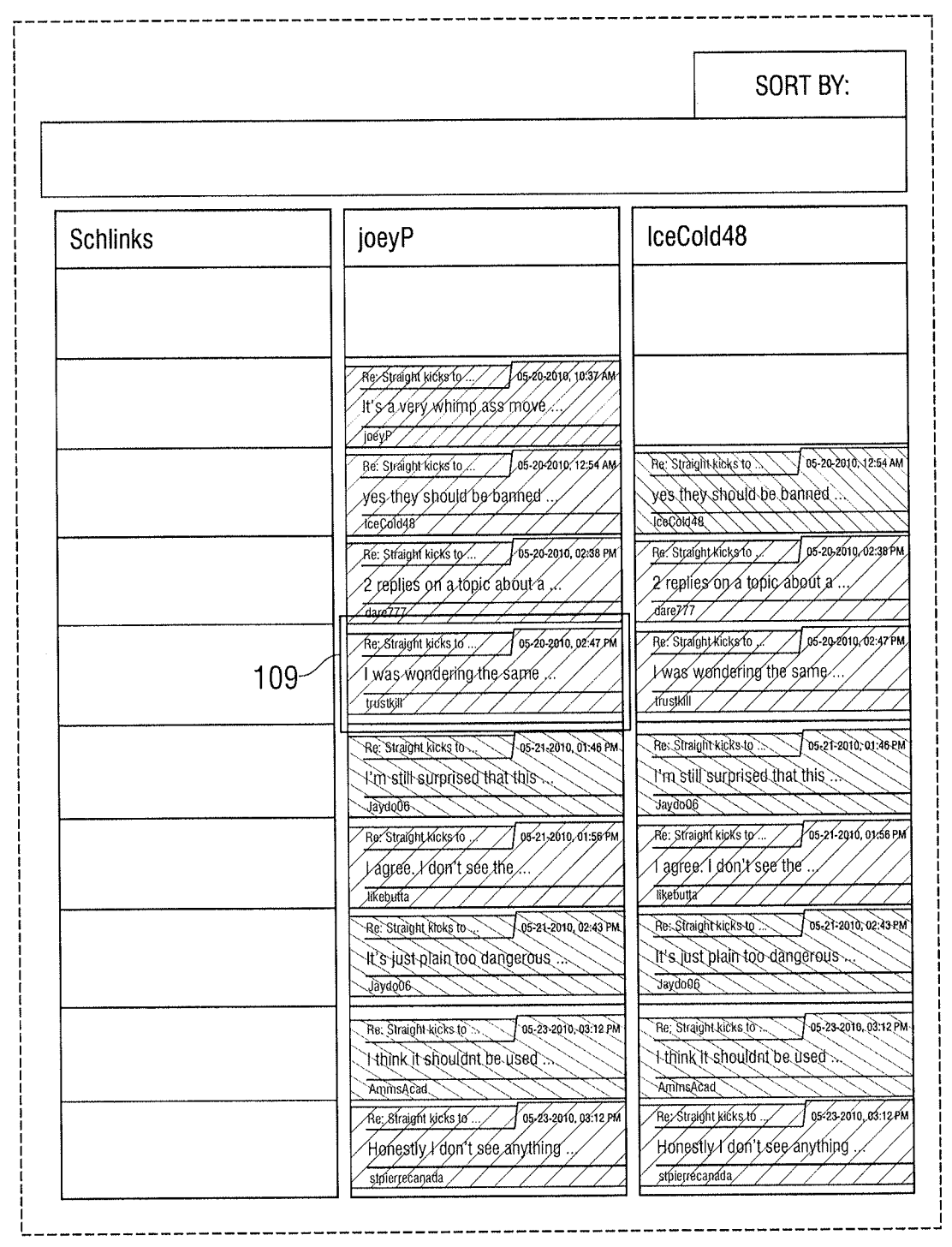
Figure 1E:
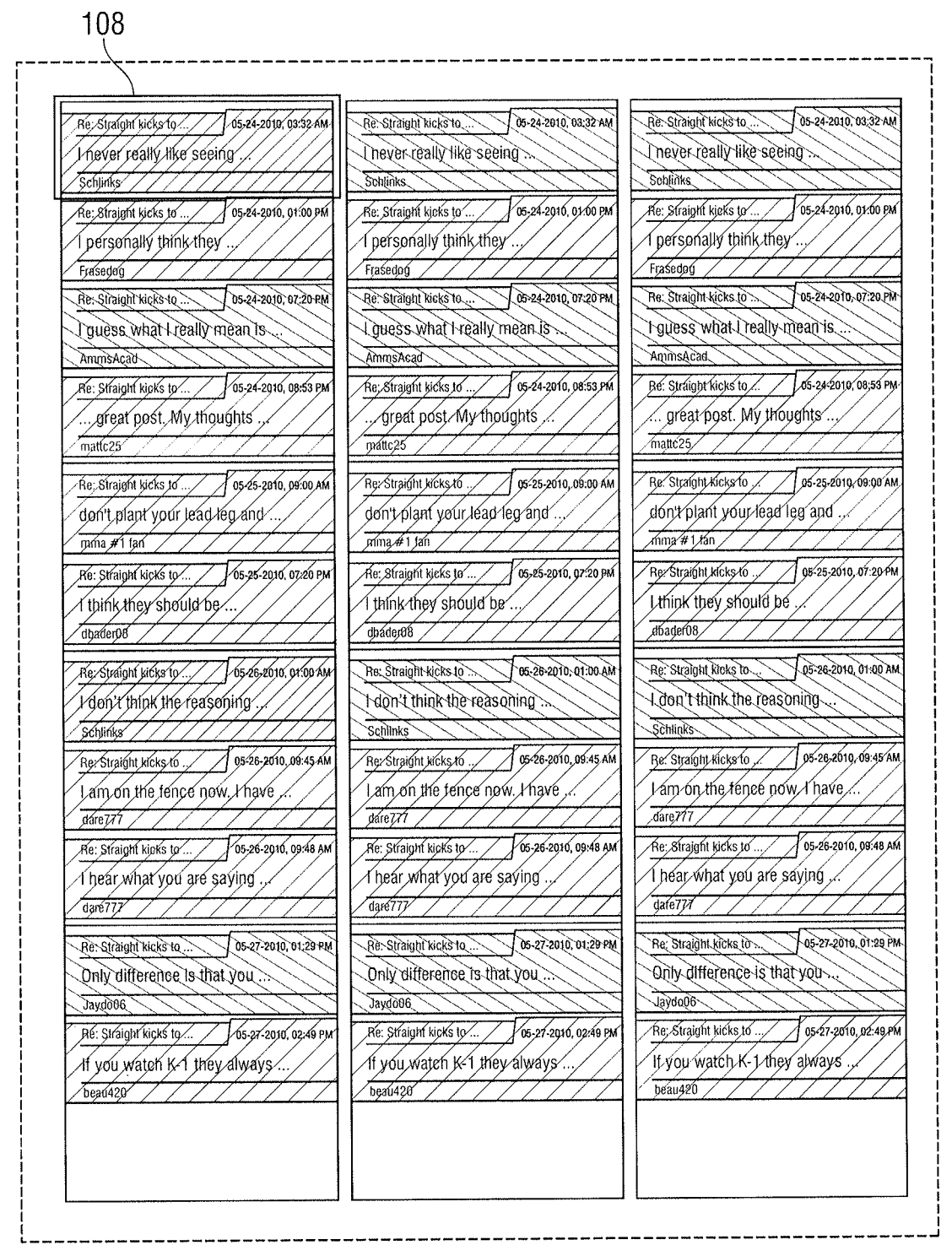
Figure 1F:
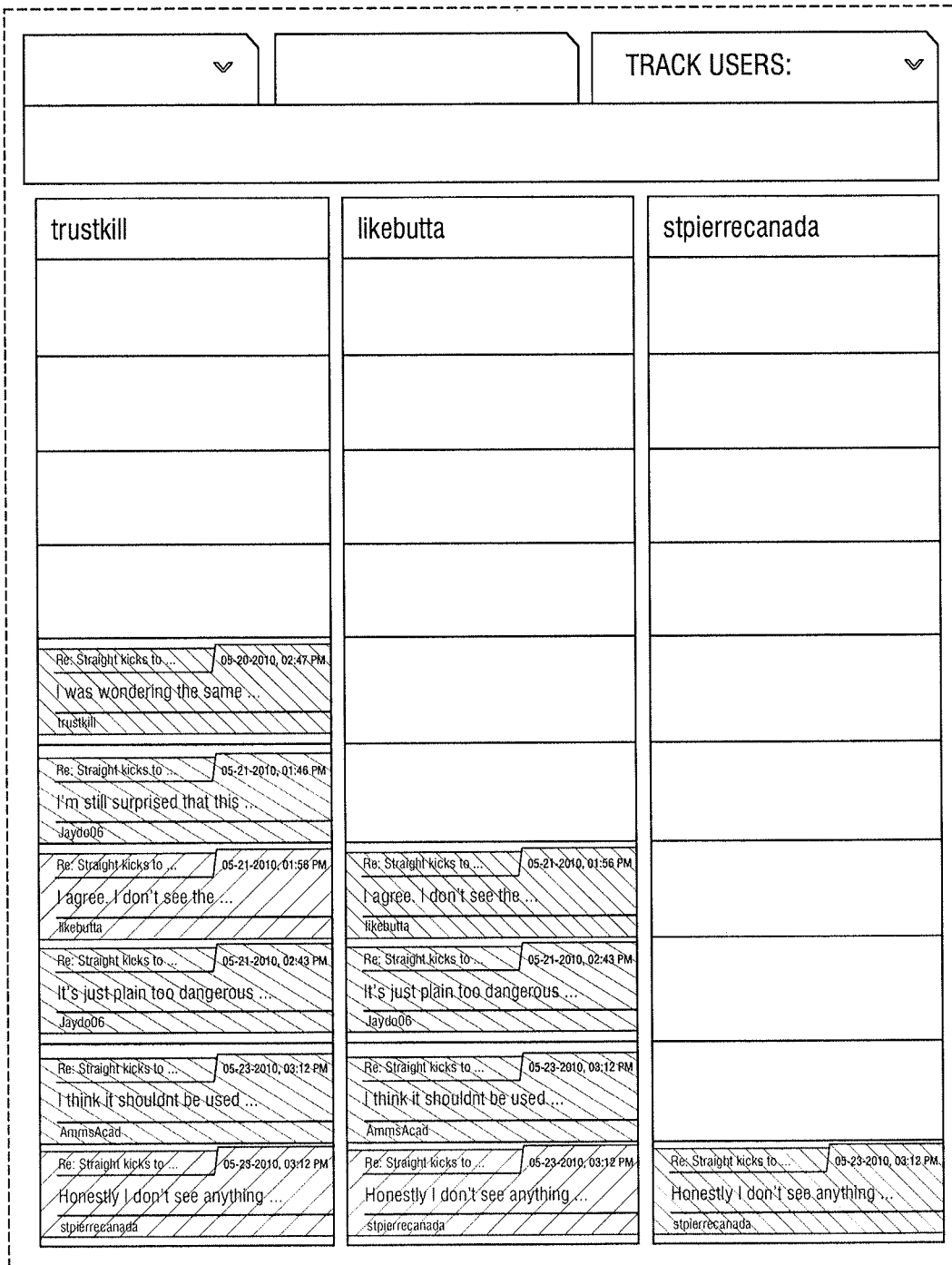
Figure 1G:
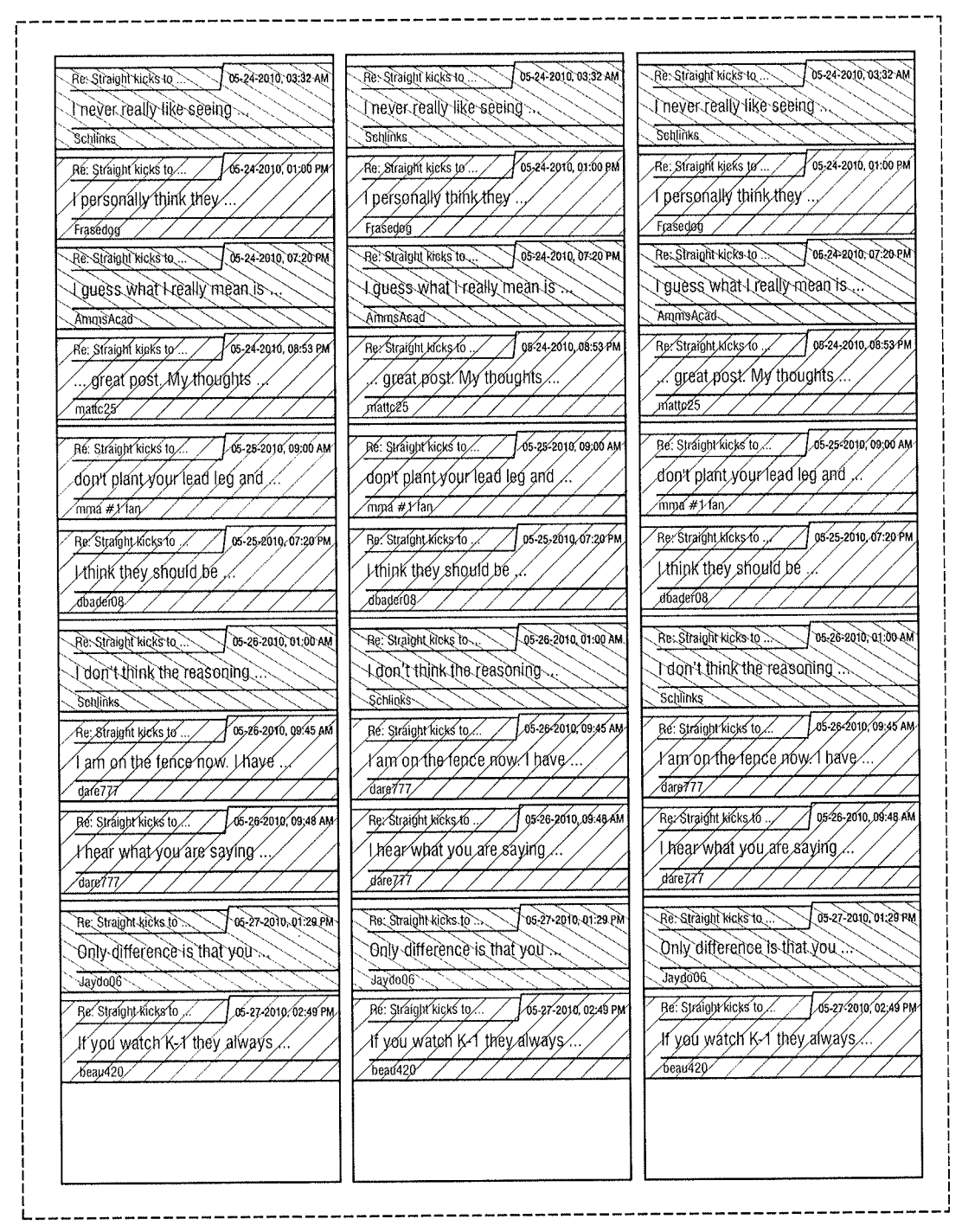
Figure 1H:
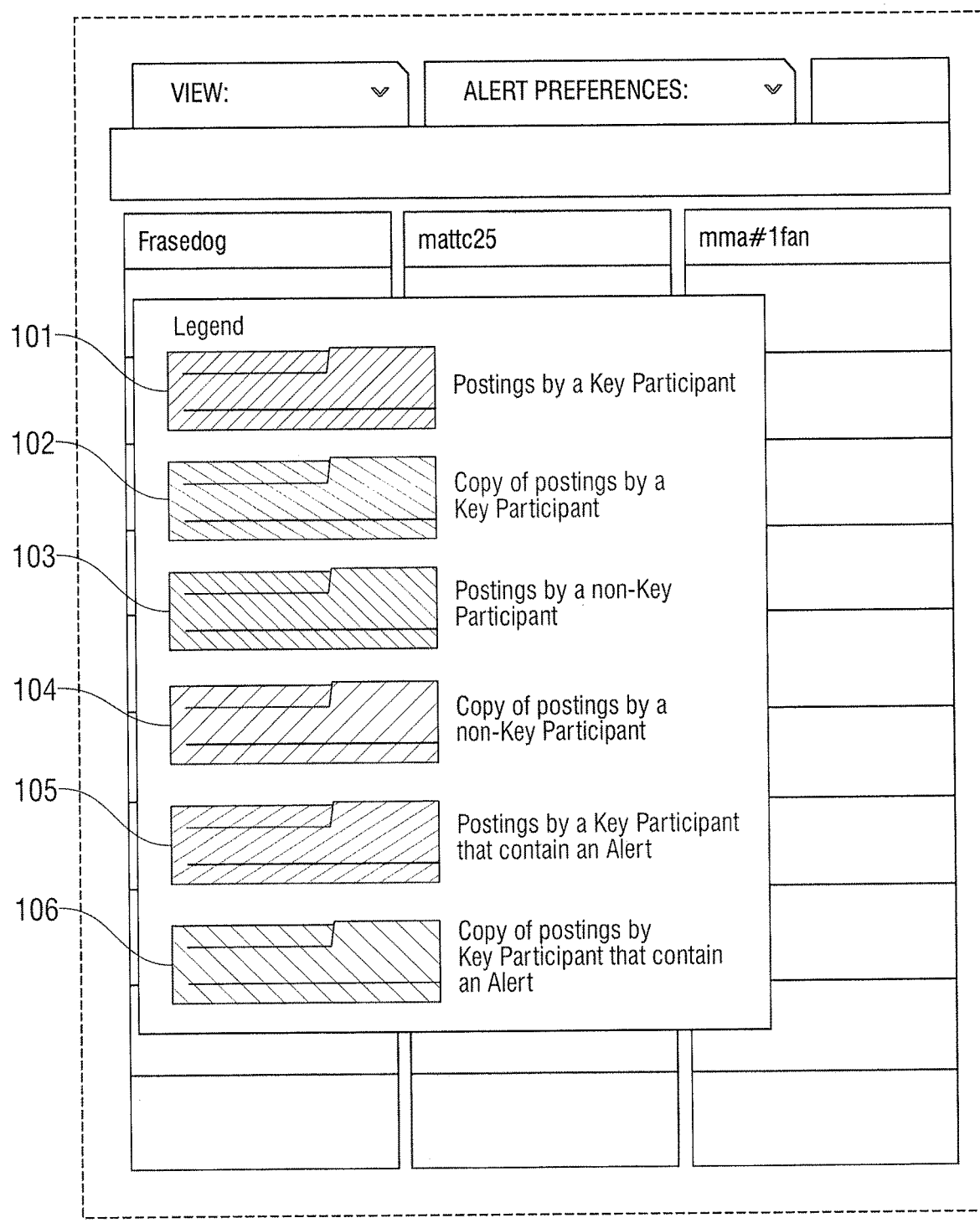
Figure 1I:
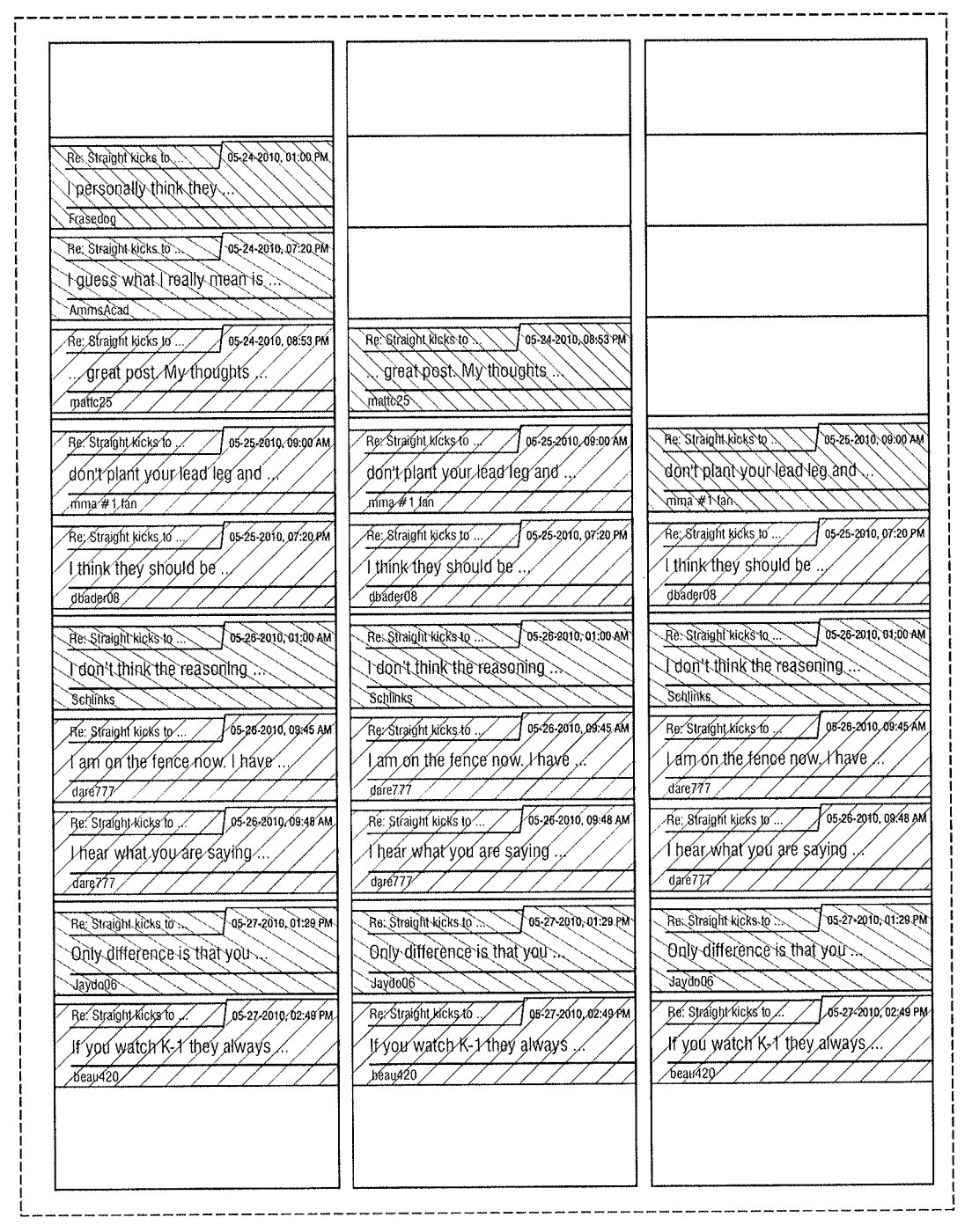
Figure 1J:
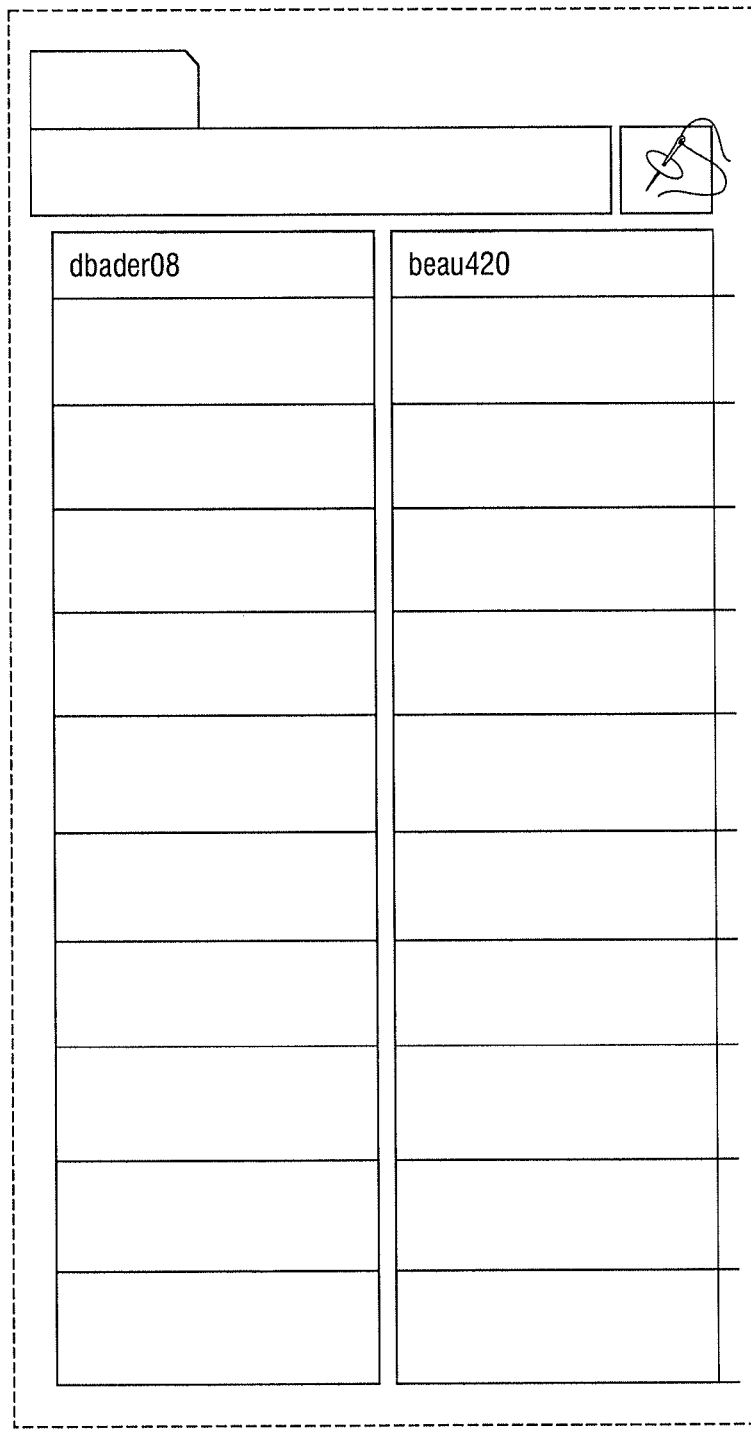
Figure 1K:
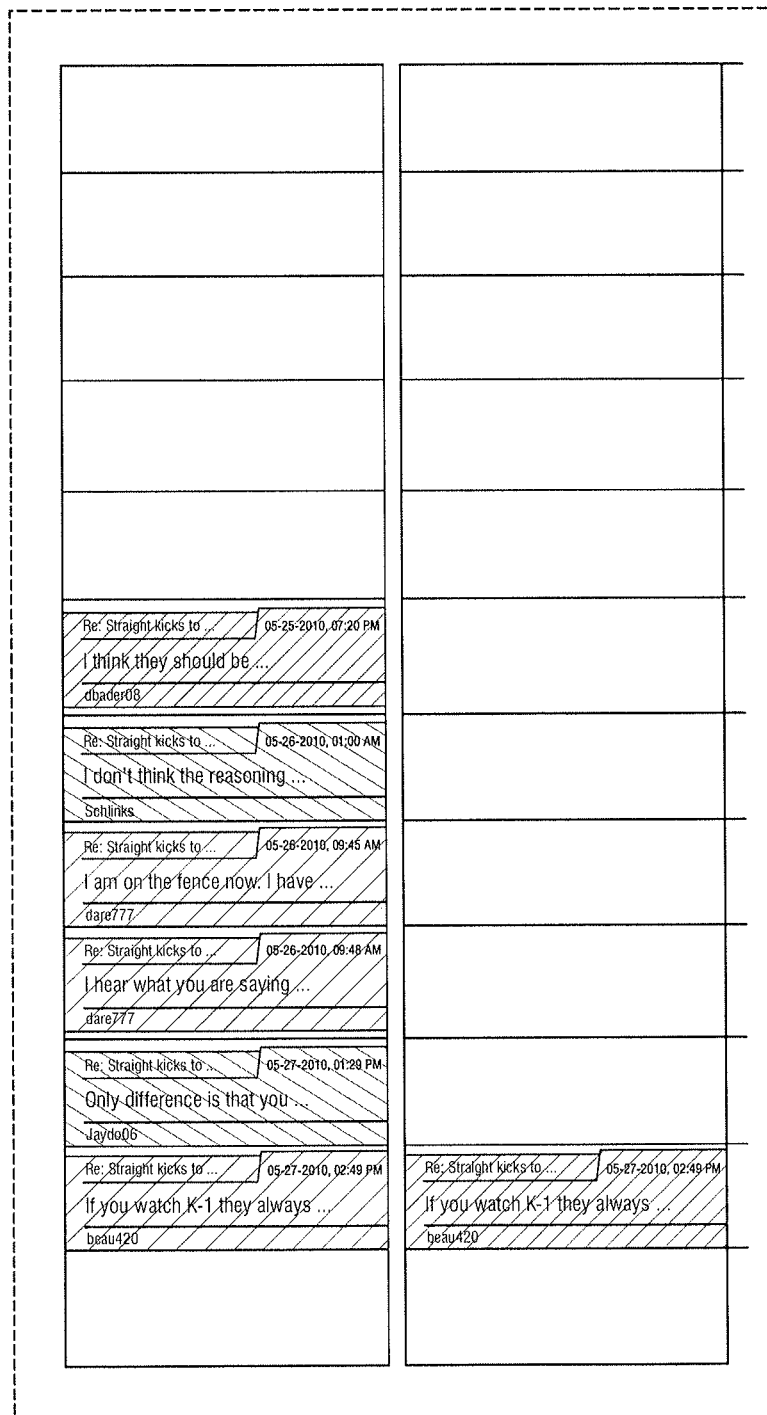

FIG. 1A, including magnified portions of FIG. 1A shown in FIGS. 1B-1K, are an example of a sorted presentation of messages from a linear BBS. The system can sort the messages of the linear BBS according to certain parameters related to the messages and/or their senders. One parameter is the behaviour of the sender of a message. For example, the system can do the following:

The pull-down and right-click menus work together to allow an analyst to focus on the Participants' behavior, and to selectively rank and order the Participant columns. For example, the user may:

group posters that are frequently online concurrently and closely monitor their behaviour;

automatically track posters who make a posting that triggers one of the Alert Preferences specified by the analyst;

highlight posters that frequently make long postings, because they may be trying to radicalize or recruit readers or other posters;

highlight posters that frequently post short messages, because those may be very specific operational instructions;

highlight postings containing Alert triggers (Keywords, Sentiment, Locations, Currencies, etc.) that may be out of context for the bulletin board group (e.g., why is the poster talking about Somali currency or Mogadishu in the middle of a bulletin board focused on UFC mixed-martial arts fights?)

After sorting, the system uses color coding to identify types of messages and their relation to other messages. In one embodiment, there are six levels of coding as shown in the legend on FIG. 1A, including magnified portion of FIG. 1A shown in FIG. 1H. It should be understood that the color coding is present for purposes of example only. The system may be implemented with different colors, with shading, with no color, or any other manner if indicating differences between messages.

A key participant 101 is identified by dark red. Copies 102 of postings of a key participant are identified by light red. Postings 103 by non-key participants are identified by dark blue. Copies 104 of postings by a non-key participant are identified by light blue. Postings 105 by participants that also contain an alert are identified by dark orange, and copies 106 of postings of a key participant that contain an alert are identified by light orange. This color coding is given by way of example only and may be changed by the analyst as desired. In addition, the system can be set so that the poster of any message that triggers an alert is defined automatically as a key participant.

Message 107 is an example of a posting (message) of a key participant. In this case, a poster identified as Jaydo06 has been identified as a key participant. In the example shown, all of Jaydo06's postings are in the same column. Copies of each of Jaydo06's postings are shown as copies in a row and appear in each column that has postings at the time of or earlier than the respective Jaydo06 posting. This convention is true for all other posting by key participants or non-key participants; copies of each of a key participant or non-key participant's posting appear in each participant column where the participant has made a posting at the time of or earlier than the respective posting. This shows the relative time relationship between postings of other key participants and non-key participants. In one embodiment, if one posting quotes another or contains similar words, the system links the postings by using identifying iconography. When a non-Key Participant is designated as a Key Participant, the system pivots on the search; i.e. if system is set to find other postings and/or users using phrasing that ties back to a Key Participant, then system will pivot on the search.

In the example of FIG. 1A, including magnified portions of FIG. 1A shown in FIGS. 1B-1E, four key participants (Jaydo06, AmmsAcad, Schlinks, joeyP) are shown in dark red and each have their own column that begins with their first posting that is made at some point in time.

The system includes a number of tools to aid in use and navigation of the display of messages. The top of the display of FIG. 1A, including magnified portions of FIG. 1A shown in FIGS. 1D, 1F, 1H includes a number of tabs such as "sort by", "track users", "view", and "alert preferences". The system also provides tools such as mouse-over and right-click to provide additional features, views and identifiers. The trident tool shown at the left of FIG. 1A also provides a way to navigate to through the messages.

Figure 2:
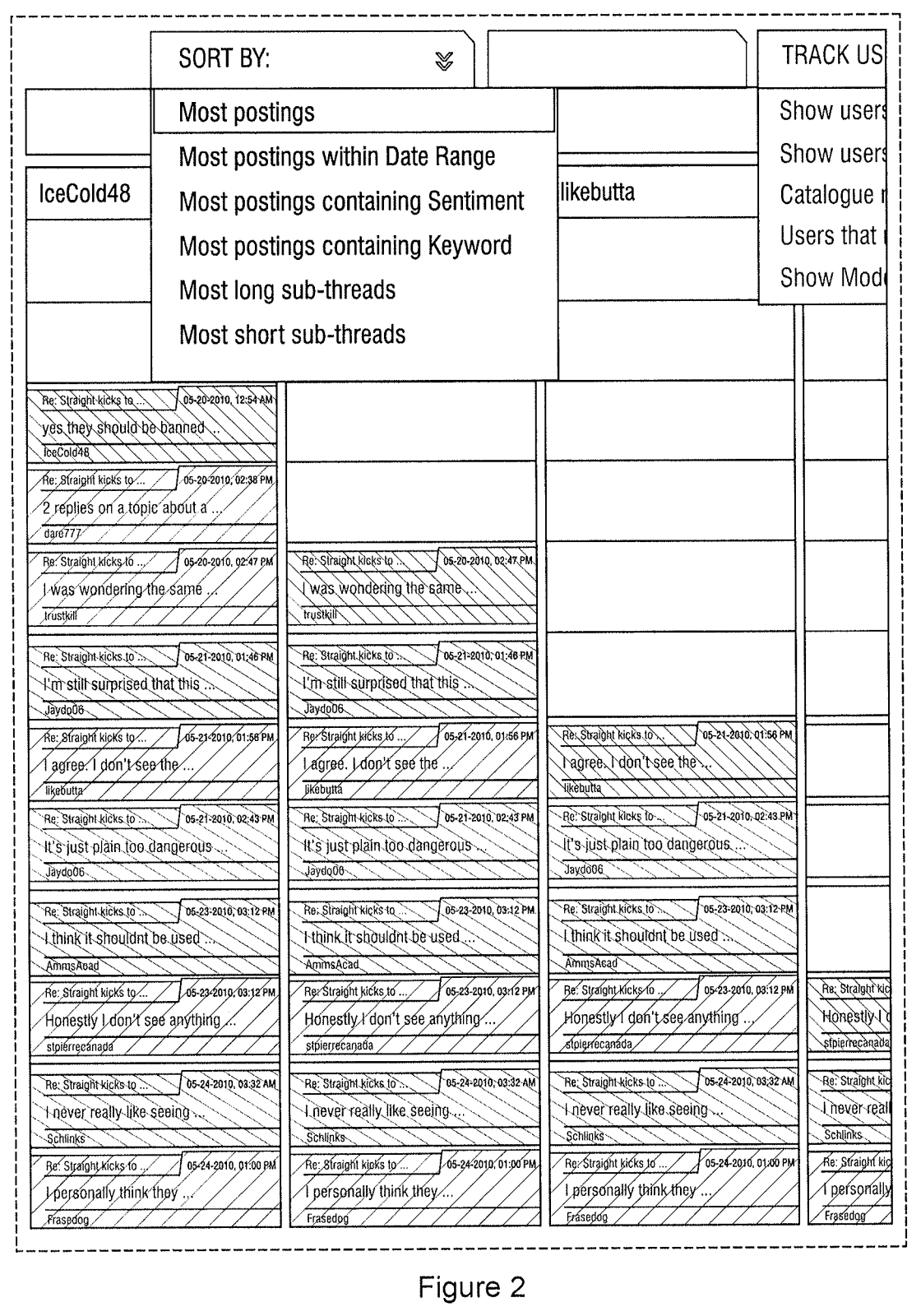

The Sort By tab shown in FIG. 2 allows the user to sort the messages using a number of qualifiers, including most postings, most postings by date range, most postings containing Sentiment, most postings containing a Keyword, most long sub-threads, and most short sub-threads. For intelligence applications, these sorting tools can be useful in identifying patterns that may represent activity of interest.

Figure 3:
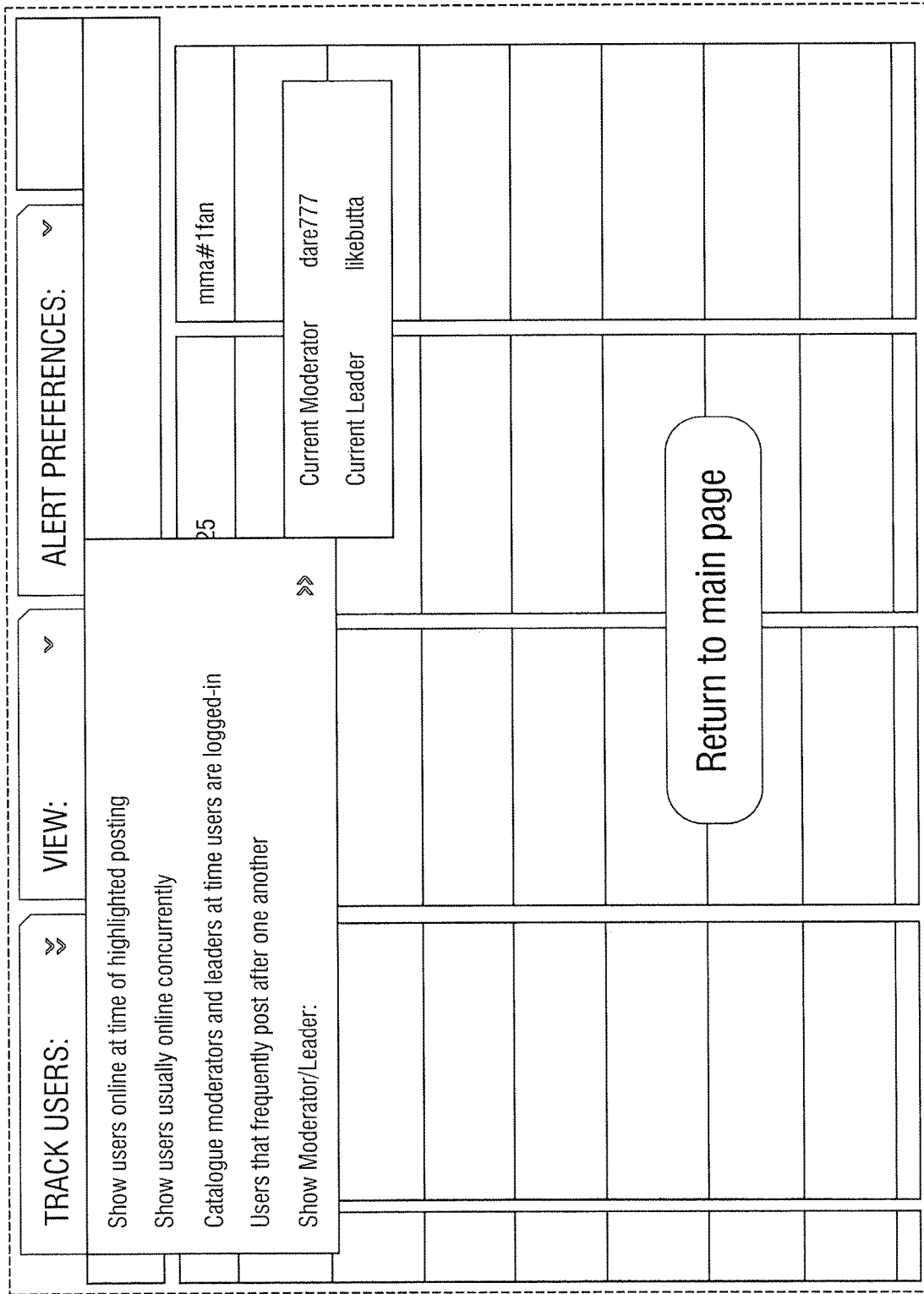
FIG. 3 is an example of the track users feature of an embodiment of the system.

The Track Users tab shown in FIG. 3 allows different posters to be displayed or removed to aid in the analysis of the BBS. This tab allows the user to show posters (whether active or inactive) online at the time of a highlighted posting, to show posters usually online concurrently, to catalogue moderators and leaders at the time particular posters are logged in, to show posters that frequently post after one another, and show moderator leader.

Figure 4:
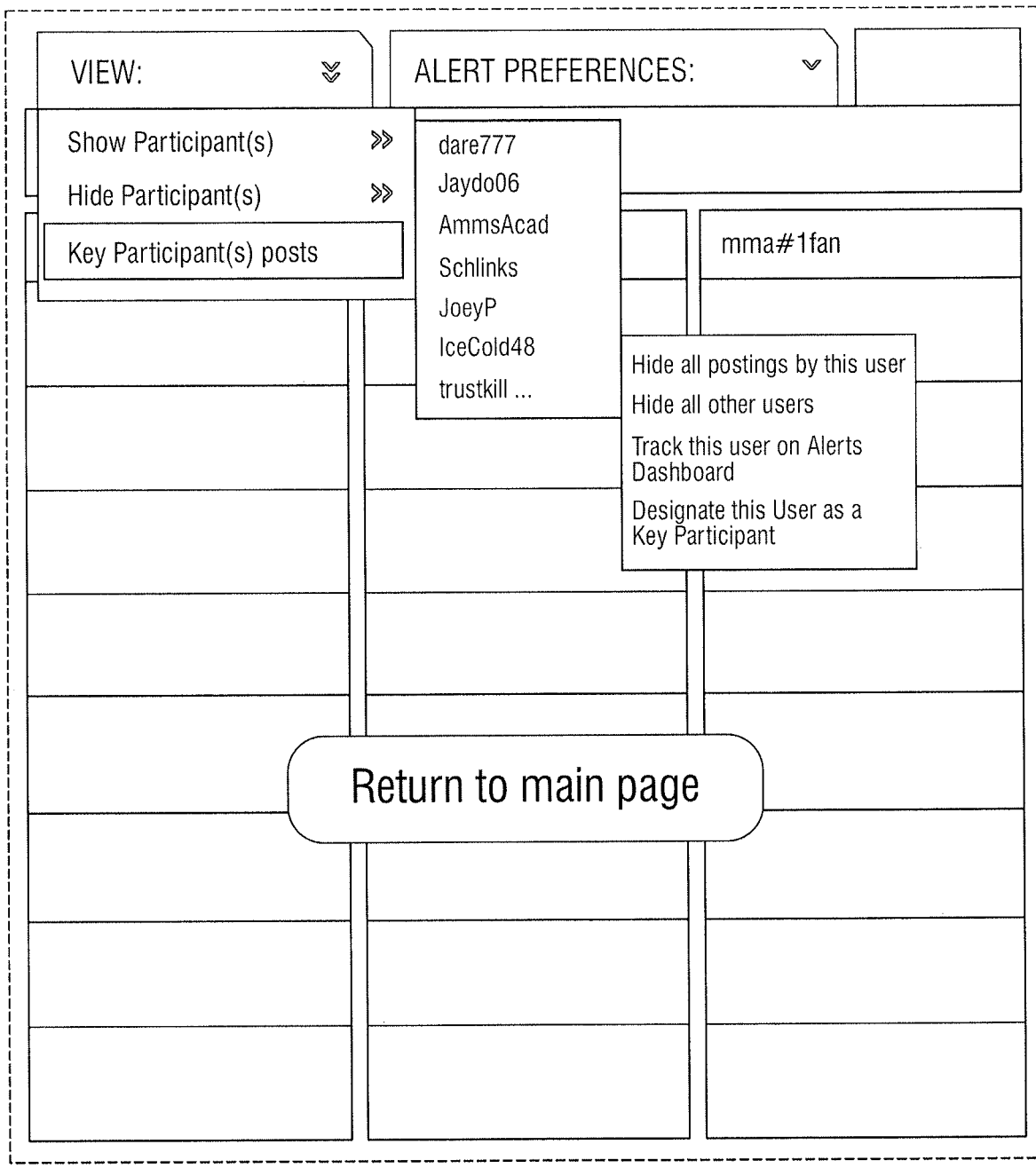
FIG. 4 is an example of the view feature of an embodiment of the system.

The View tab shown in FIG. 4 allows the user to show or hide certain participants. The tab includes choices for show participants, hide participants, and key participants posts. When the user selects any of these choices, the menu expands to show a list of users that are eligible for the desired action. When the user then mouses over to this menu and selects a poster, the system presents another expanded menu for options for this particular poster, such as hide all postings by this poster, hide all other posters, track this poster on Alerts, designate (or undesignated) this poster as a Key Participant.

Figure 5:
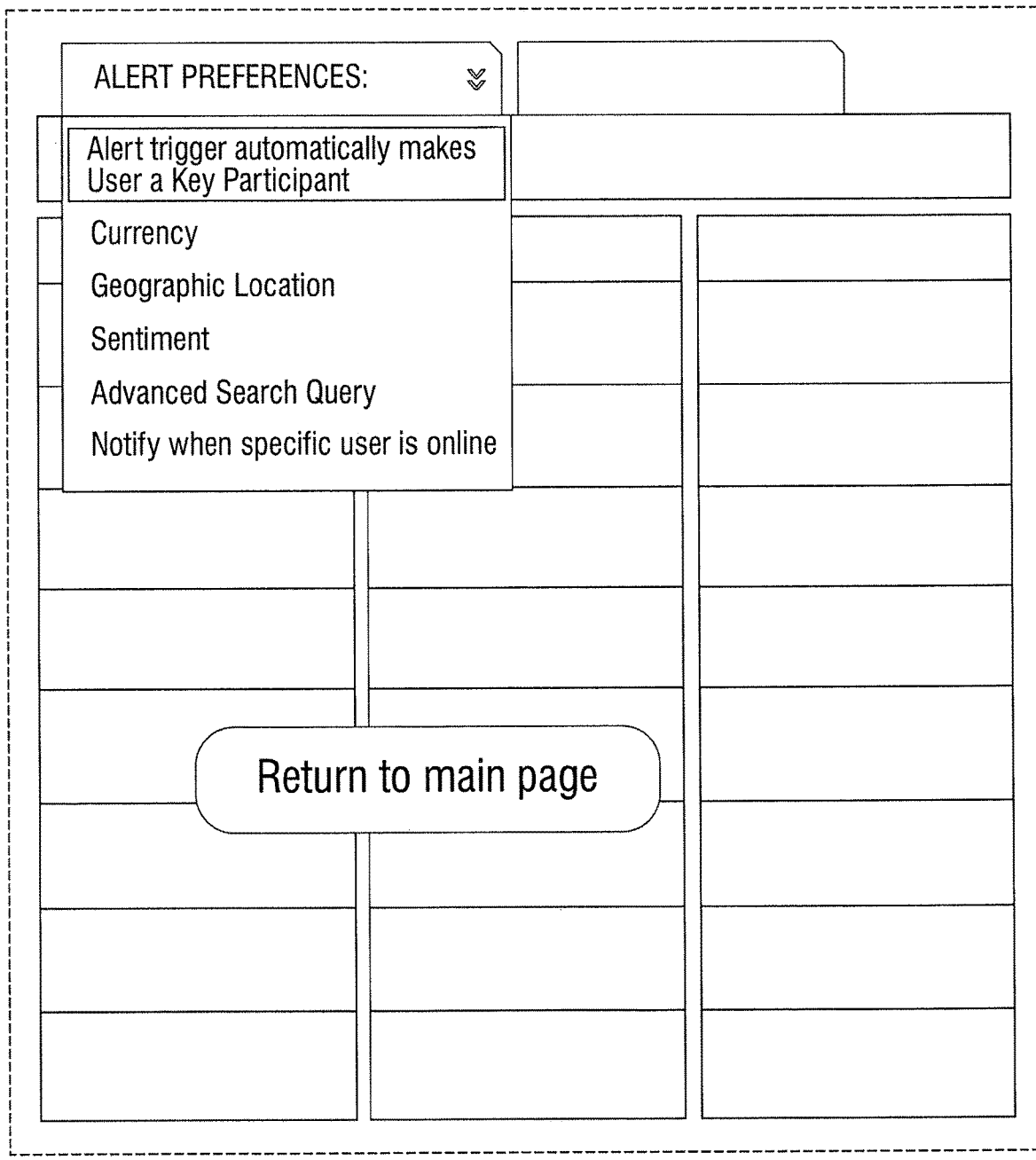
FIG. 5 is an example of the alert preferences feature of an embodiment of the system.

The Alert Preferences tab shown in FIG. 5 allows the user to set parameters to search for in postings (regardless of whether the poster is a key participant or not). The system may allow for a default identification of a participant as a key participant if an alert trigger is found, but this is optional. The system allows alerts to be defined for currency, geographic location, sentiment, or other terms using an advanced search query. The system may also send an alert whenever specific posters are online.

Figure 6:
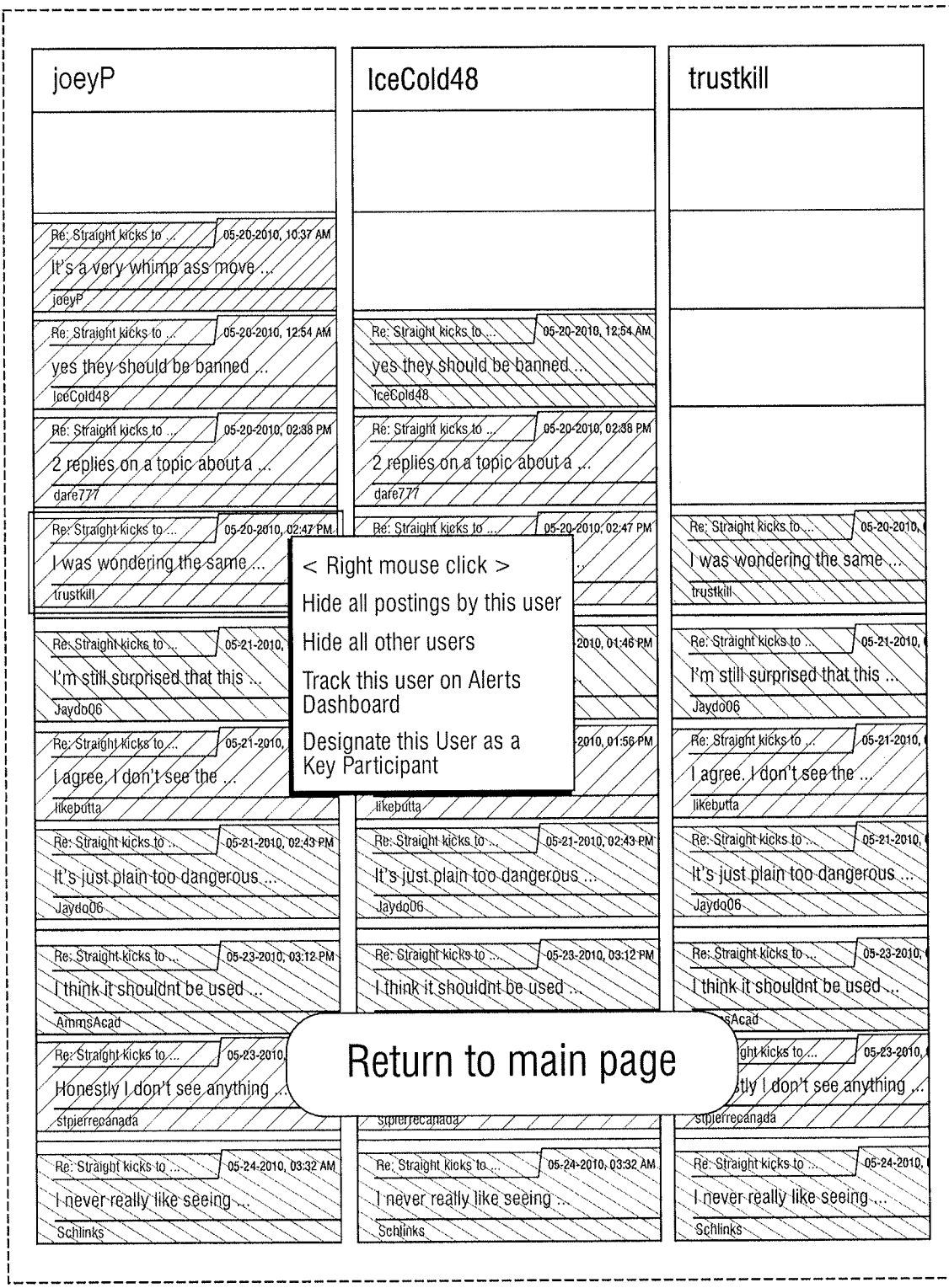
FIG. 6 is an example of options provided by right-clicking on a message.

FIG. 6 shows an example of options provided by right-clicking on a message. The system provides a menu that allows options to be taken for the poster associated with this message, such as hide all postings by the poster, hide all other posters, track the poster on Alerts, or designate (or un-designate) the poster as a Key Participant.

The system also provides mouse-over capabilities such as to trigger a popup that shows the full message of a particular message. This allows browsing of the messages without opening up the message separately.

Figure 7:
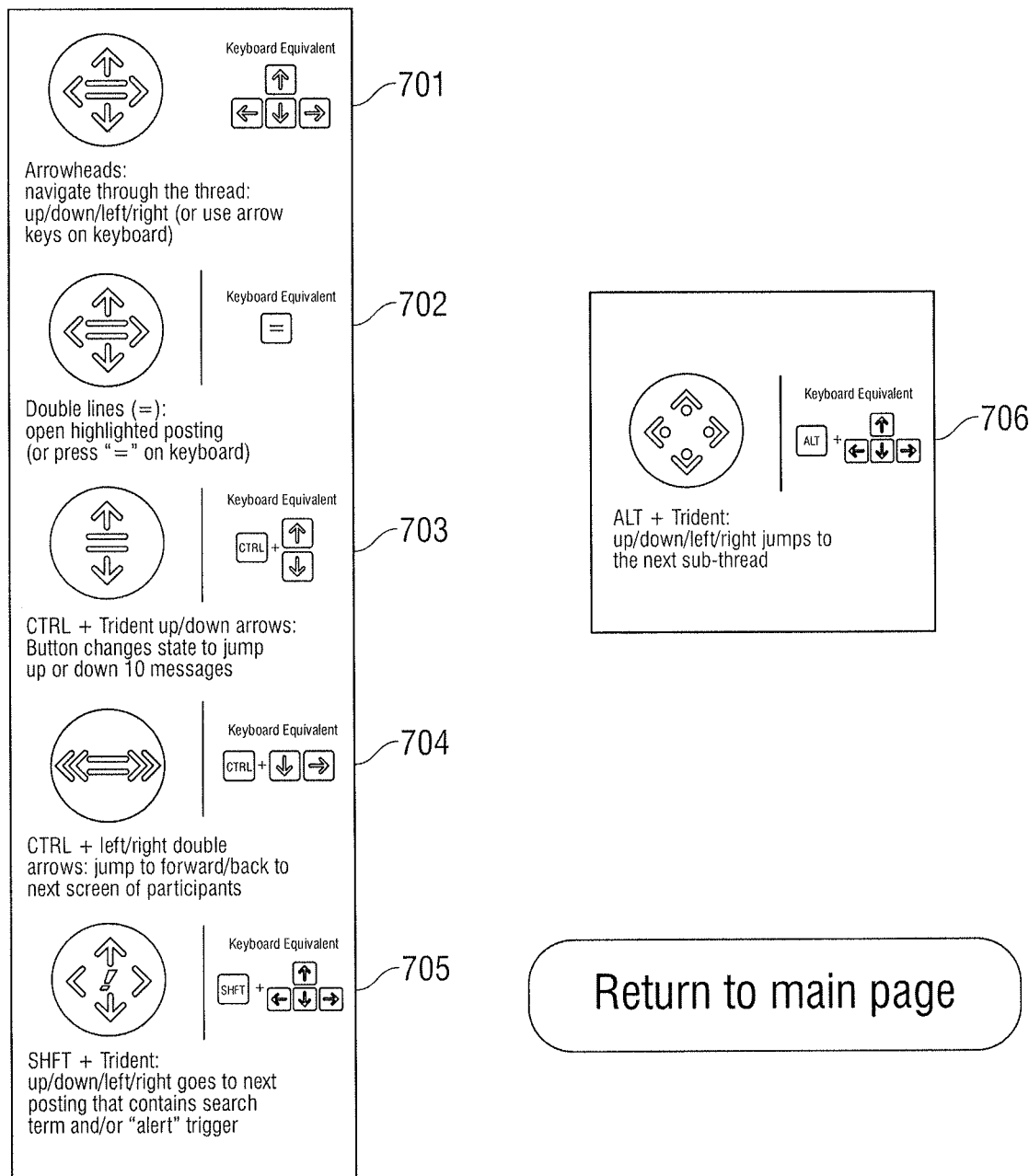
FIG. 7 is an example of the navigation options of the trident tool.

FIG. 7 shows the navigation options of the trident tool. The arrowheads on the navigation tool allow movement through threads up/down and left/right. The = symbol will open an highlighted posting. Using control plus the key allows the user to jump up or down ten messages at a time. Control plus left/right allows the user to jump forward or back to the next screen of participants. The shift plus trident can jump from posting to posting that contains a search term and/or a trigger. Alt+Trident allows the user to jump to the next sub-thread, where sub-threads exist in the original bulletin board thread.

The navigation tool in one embodiment typically appears as at 701 and 702. The tool has four directional arrows (up, down, left, right) which can be accessed by clicking on the tool or by using the arrow keys on the keyboard. Clicking on one of the directional arrows will move the user one message where the step depends on where the user is accessing the tool.

Clicking on the equal sign, or using the equal sign on the keyboard, will toggle the expansion or contraction of a thread or message, depending on where the navigation tool is accessed. When a message or thread is highlighted, the keyboard is active for the navigation tool in the highlighted object, By clicking the Ctrl button on the keyboard, the navigation tool appears as at 703. In this case, the up and down arrows show a number that represents how many steps in the chain each click of an arrow will advance. A click will move the user ten messages up or down for example. The left and right arrows at 704 when the Ctrl button is pressed will move the user to another screen if the display cannot show the entire BBS at once.

Clicking on the shift key causes the navigation tool to appear as at 705. This mode ties into, for example, a search operation. The user can define a term or terms, and each click of the directional arrows will move the user to the next message that satisfies the search criteria.

Alt clicking causes the navigation tool to appear as at 706. This allows the user to move through threads and sub-threads of messages.

Threaded BBS

FIG. 8 is an example of a BBS that has threads and sub-threads. The highest level threads are shown at the furthest left in the outline presentation. Sub-threads, and sub-sub-threads are shown with one or more indentations. The structural nature of threaded BBS's allows a different manner of presentation. It should be noted that a threaded BBS can also be presented in the same manner as a linear BBS as desired. One of the differences between a linear and a threaded BBS is that the threaded BBS will include additional metadata showing the connected messages in a thread and the nature of the relationship (e.g. reply, forward, etc.).

Figure 9A:
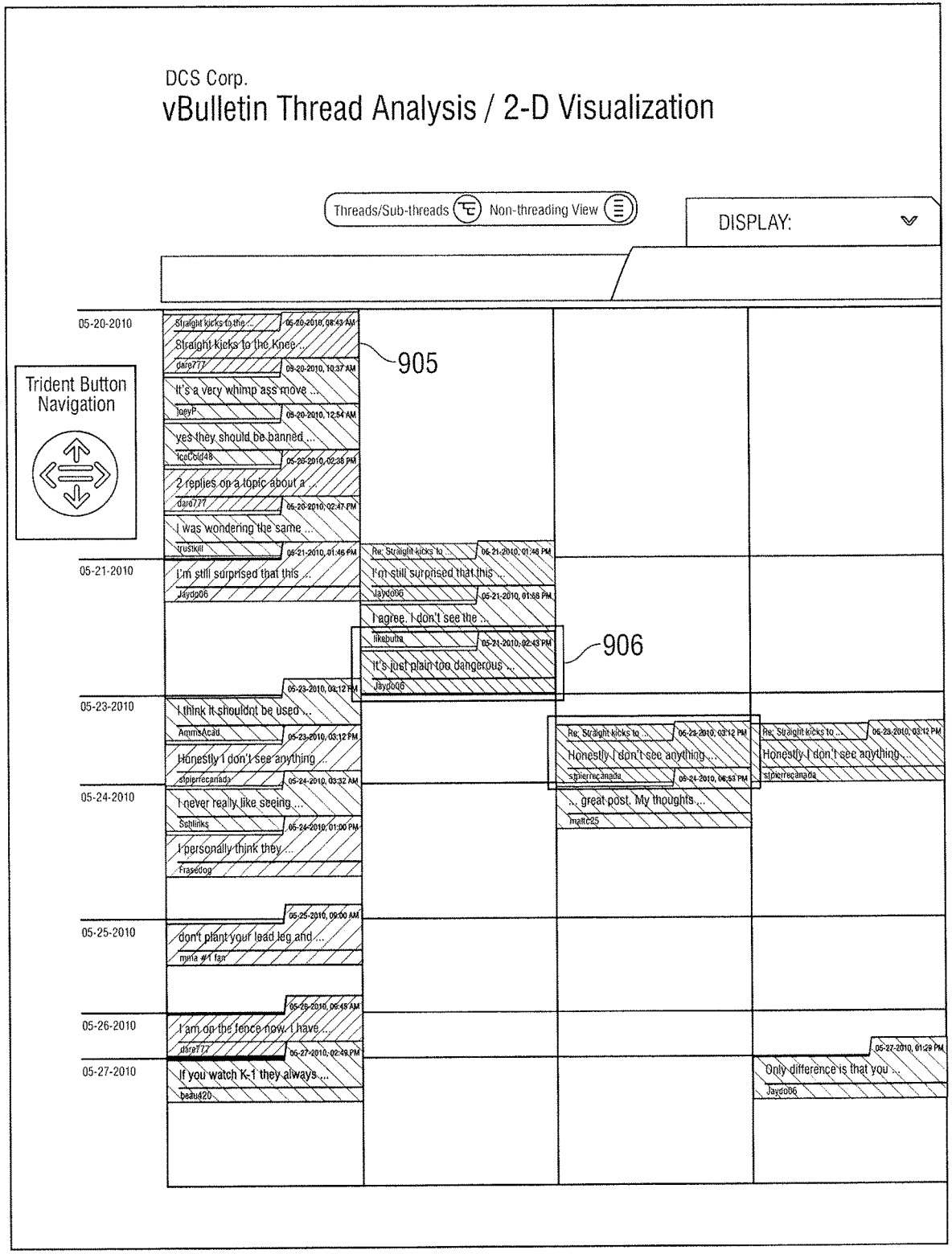
FIGS. 9A-9B illustrate a 2D visualization of a threaded bulletin board.
Figure 9B:
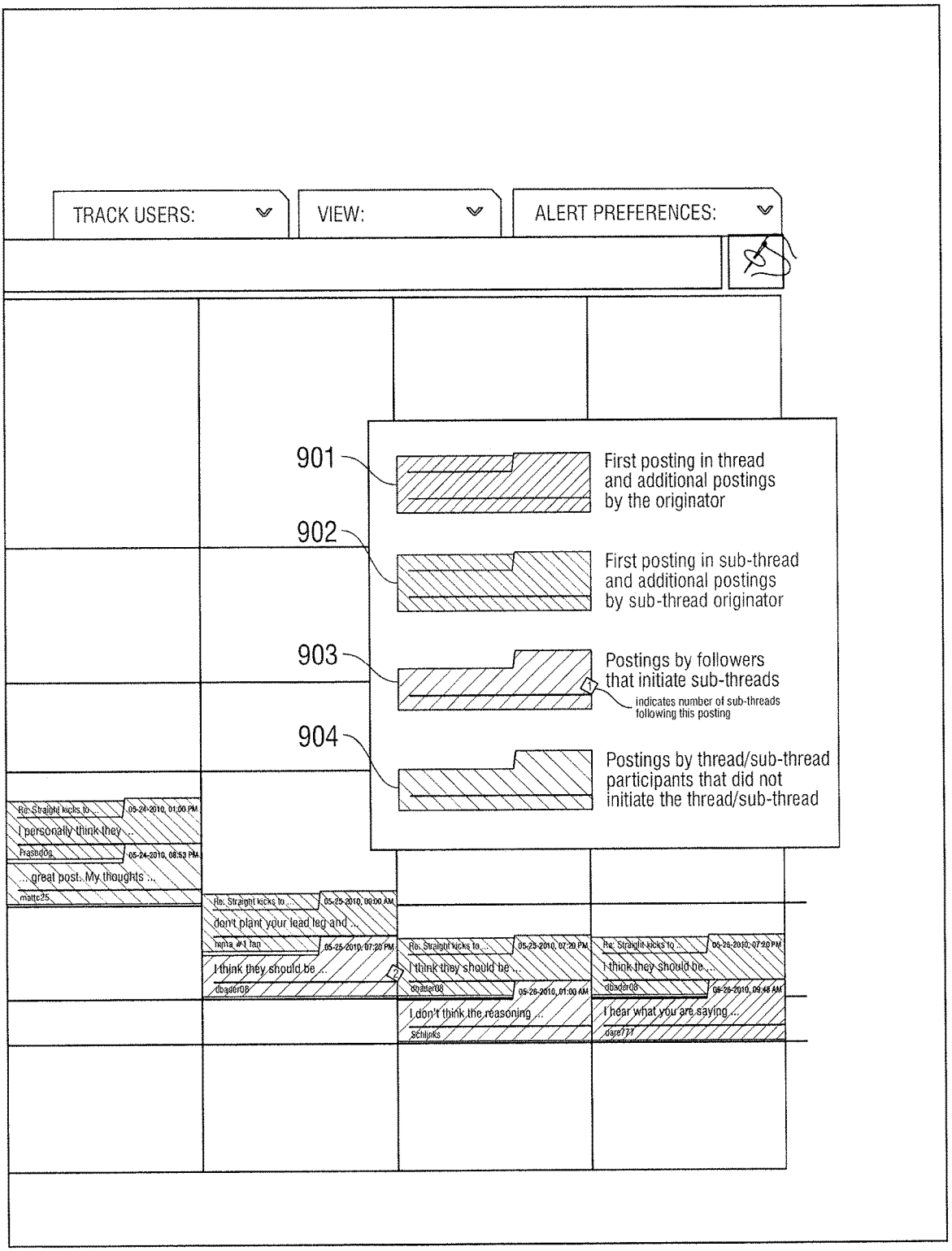

FIGS. 9A-9B are a view of presentation of a threaded BBS after a user defined sort has been applied. In this embodiment, colors 901, 902, 903, and 904 are used to indicate status of certain messages. Red 901 represents the first posting in a thread and additional postings (e.g. post 905) by the original poster (OP). Blue 902 represents the first posting in a sub-thread and additional postings (e.g. post 906) by the sub-thread originator. Light blue 903 represents posters by followers that initiate sub-threads. Orange 904 represents postings by thread/sub-thread participants that did not initiate the thread or sub-thread.

The tabs at the top of the display and the trident navigation tool operate in a similar manner as described above with respect to the linear presentation system. Alt+Trident allows the user to jump to the next sub-thread, if the sub-threads exist in the original bulletin board thread. This feature is particularly useful if the user has chosen to represent a thread with sub-threading using the linear mode of the application, so that they can take advantage of the various Sort By and other features of the linear mode. Shifting a thread with sub-threading to the linear mode allows the user to navigate the linear representation of the thread as though the sub-threading was still present.

Figure 10A:
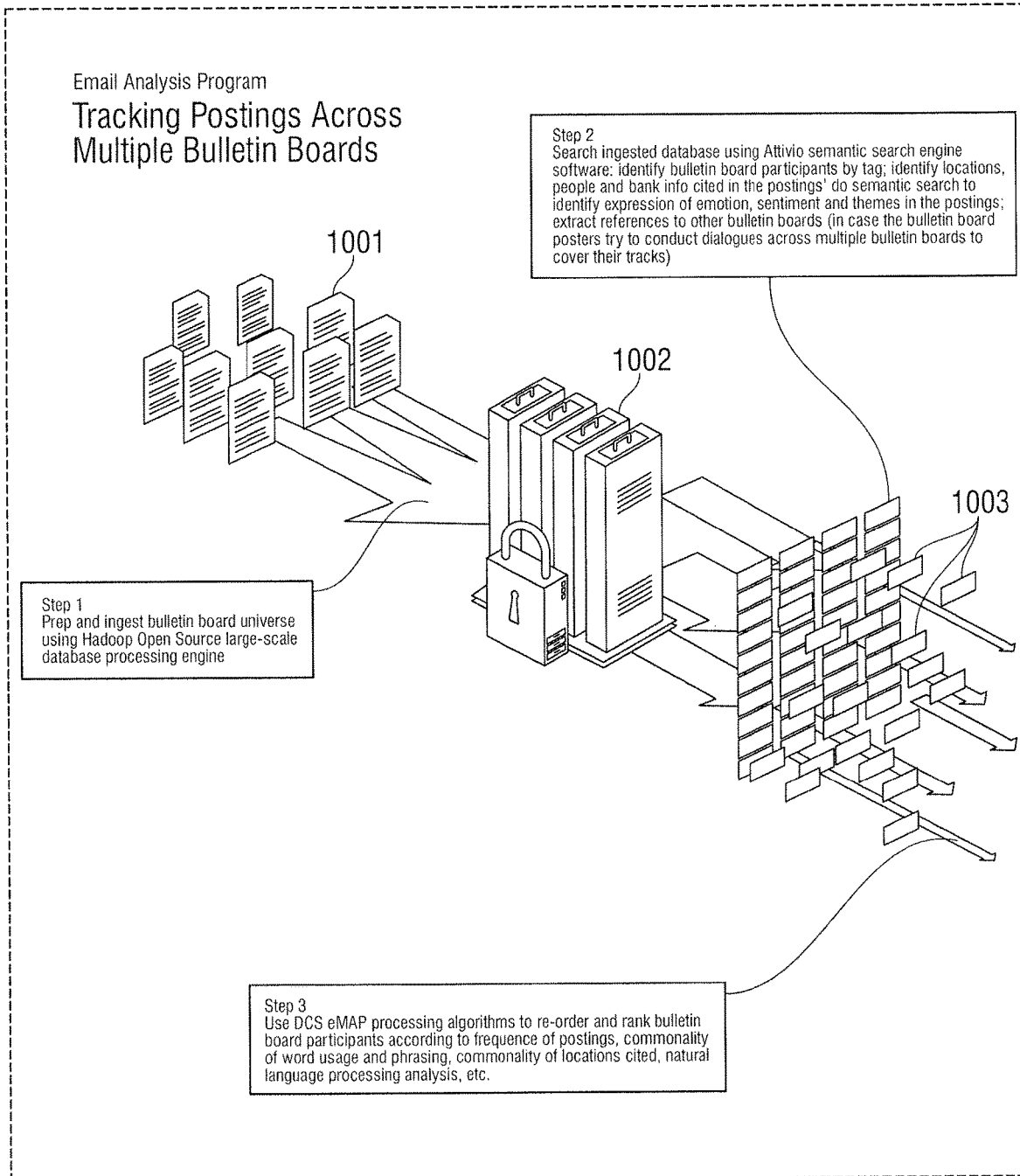
FIGS. 10A-10B illustrate an example of tracking across multiple BBS's in an embodiment of the system.
Figure 10B:
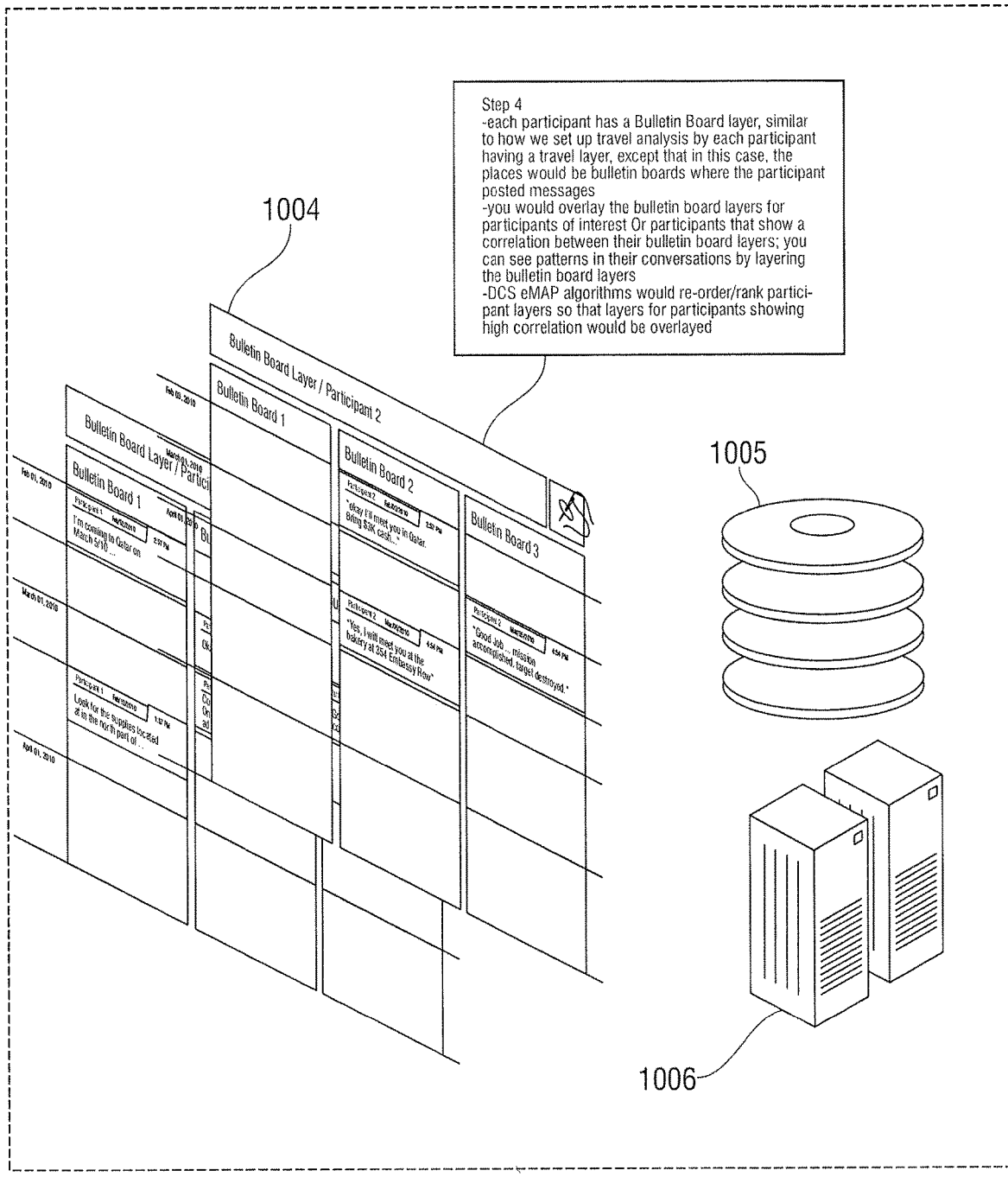

FIGS. 10A-10B illustrate an example of tracking across multiple BBS's in an embodiment of the system. Data from a plurality 1001 of BBS's is provided to server/processor 1002. The data is analyzed using, for example, Attivio semantic search engine, to identify messages of interest and to add meta-tags to the data as appropriate. Searches can be performed to pullout data of interest 1003, This data is then present visually 1004 and information can be stored in database 1005 and servers 1006.

The system is not limited to BBS's but can present the relationship between multiple types of communications including emails, instant messages, texts, tweets, wikis, blogs, voice conversations such as phone calls, postings on social networks such as Facebook, My Space, etc. and other types of communications. In addition, the system allows for the inclusion of transactional information, including financial transactions, physical movement, asset deployment, or other acts or activities that may be related to, or independent of, the communications.

An embodiment of the invention may be implemented in any type of computer system or programming or processing environment, such as tablet PC, iPad, touchscreen device, PDA, smart phones, etc. and will have the corresponding navigational features and tools of those devices.

Communications from each of these sources may be processed as a batch, or in a continuous manner as data arrives from each source, such as live monitoring of communications. Communications may also arrive multiple times or out-of-order, as they are placed in order and de-duplicated by the system.

Tag Clouds/Search Bar Interaction

In one embodiment of the system, data presentation can be via a tag cloud. Tag clouds are a way of visually representing the frequency of terms, words, concepts, or objects in a document or database. There are several different formats for tag clouds, but one format that can be used effectively in this system is the tag cloud format where the most common terms, words, concepts, or objects appear in the center, and then the levels of frequency decrease in concentric circles as you go outwards away from the center.

Instead of just gradating the different terms, words or objects in the tag clouds according to frequency, the user may apply different criteria to the tag cloud visualization, such that terms or words may appear larger or smaller according to certain user-specified boosting criteria. For example, nouns or locations could be set to appear larger than adjectives. Additionally, using proximity analysis, where the user specifies that certain words appearing in the same phrase are more relevant than if they appear in separate phrases, a boosting co-efficient can be assigned to certain phrases or word groupings.

In one embodiment of the system, when the user is viewing a threadlist screen containing a list of communication threads in the database or search results, the user has the option of showing a tag cloud in a message view window, instead of the default view which shows the text of the selected message/posting in the message view window. In one embodiment, when the user clicks on a thread header for a communication thread listed in the thread listing screen, a tag cloud representing the entire thread is shown in the message view window. When the user mouse-clicks or otherwise selects a message in the thread, the tag cloud is shown for the selected message, The user can also set "Maximum detail" option selected via a pull-down menu, a tag cloud for each message is shown instead of the text or first few lines of text in the message.

The tag cloud lets the user instantly see the relative importance or frequency of the words, terms, or concepts contained in without having to read the emails and attachments. This allows instant recognition of subject matter. By using the tag cloud, the user can understand some of the dominant terms, words or concepts in the cube so the user can start selecting search terms in order to further narrow down the data being displayed. This is particularly helpful when beginning a search over the entire database. In cases of a facet search that has been run on an entire database, there are additional options. One option is for the user to generate a separate tag cloud for each facet type (e.g. company, people, location, etc.). As a user adds or removes facets to the search query, the query becomes more focused and the tag clouds adjust.

Figure 13:
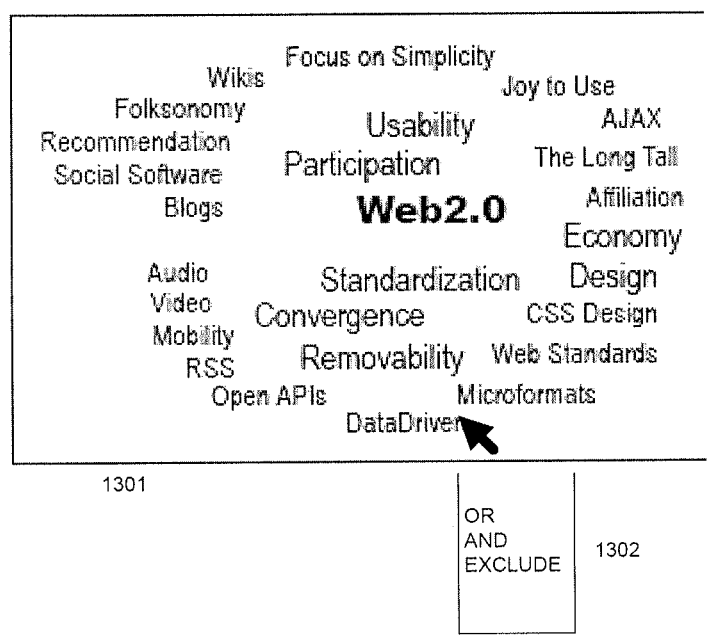
FIG. 13 illustrates the tag cloud action of an embodiment of the system.

FIG. 13 is an illustration of an embodiment of terms in a tag cloud 1301. In one embodiment, the system allows a user to right-click term in tag cloud to cycle through OR/AND/Exclude the selected term in the search bar, so that you OR/AND/Exclude the term from the current search the user is doing. See for example, menu 1302 in FIG. 13 with the options of OR, AND, and EXCLUDE, Alternatively, the user can select OR by clicking the selected term once in the tag cloud, click on the term twice for AND, and click a third time to EXCLUDE the term from the search. When a user has done a search and a tag cloud is presented, this technique allows the user to modify the search and the tag cloud on the fly by using the right click option on any term.

Social Graphs

In one embodiment, the system displays social graphs representing the relationships of users identified in the data or in a search result subset of the data. The system uses the attributes of the participant (not just the number of connections that a participant has) to determine the positioning and the size of the participant's circle in the social graph. The circles in the social graph are sized according to generation, propagation, and execution of an idea/plan: Who comes up with the idea (leader of the terrorist group or the main planner in the terrorist group; "ideas guy" in a circle of friends who thinks of a great idea for a party that everybody loves), who are the "do-ers" (the guys who buy the paint thinner or fertilizer for the bomb; the guys who buy the beer and cake for the party), the guys who execute the actual dirty work on the ground (the leader of the local terrorist cell, the guys who plant the bomb; the actual DJ at the party and the bouncer at the door).

Figures 14, 15:
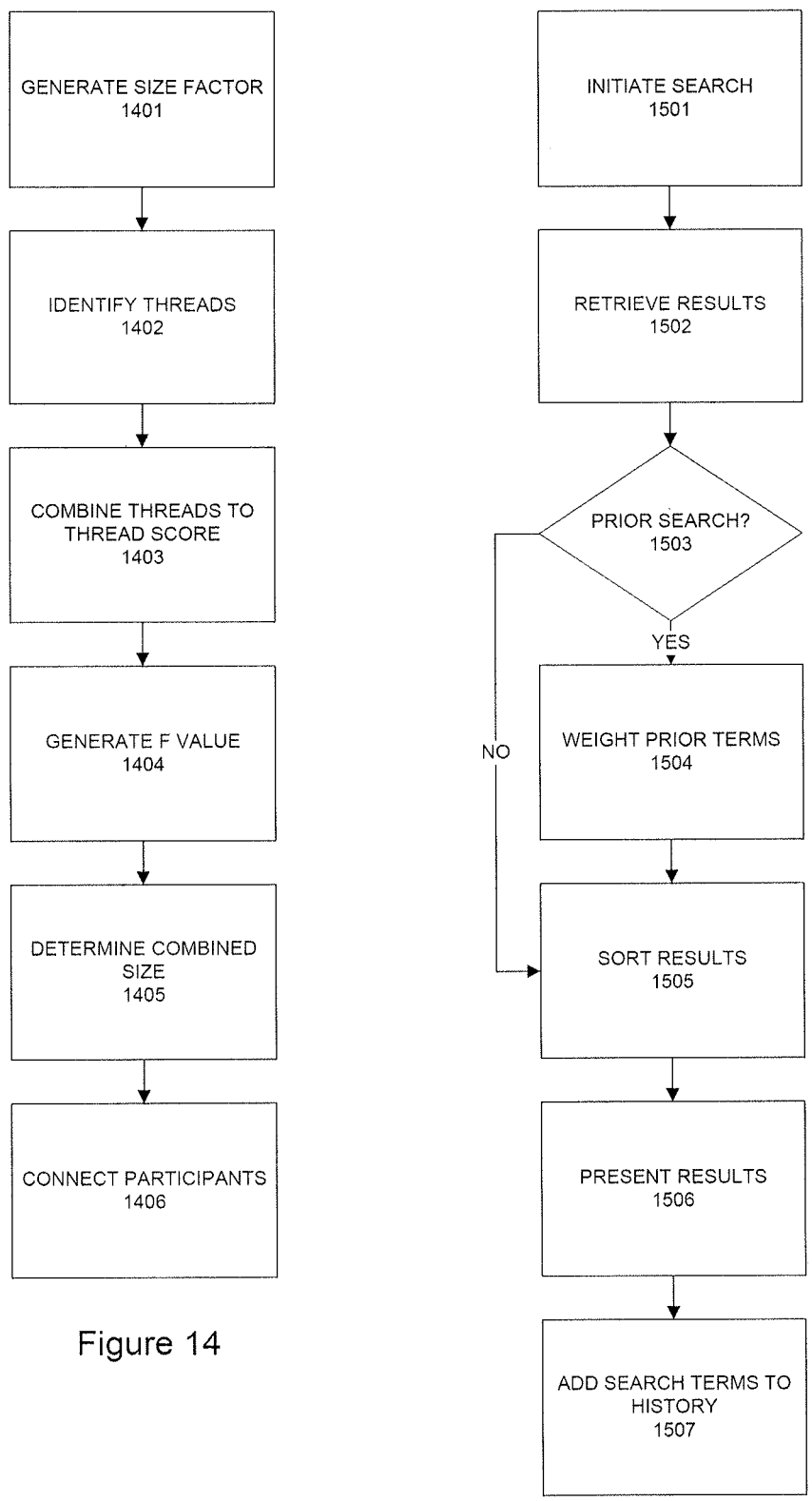
FIG. 14 is a flow diagram illustrating a method of generating a social graph using an embodiment of the system.
FIG. 15 is a flow diagram illustrating an embodiment of adaptive relevancy in searches in the system.

The flow diagram of FIG. 14 illustrates an example of generating a social graph using the system. At step 1401 generates a factor used in determining the size and positioning of the circle for each participant. In this embodiment, the system combines (with various weightings) participant-specific metrics from a metrics list to generate the factor for each participant (e.g. comp_score_participant15 comp_score_participant2 where comp_score_participant1 is defined as a composite score of various metrics such as the number of messages participant! writes that contain a certain user-defined key phrase, the number of messages between participant! and other participants in the social graph between a certain user-defined date range, etc.).

At step 1402, the system identifies the threads where that actual participant is involved. At step 1403, for those threads, the system combines the individual thread-spnumber of messages within the thread that contain a certain user-defined key phrase, threadjtmetric2 is the number of messages in the thread written by participants located in a certain geographical location, etc.) into a composite score for each thread in which the participant is involved in (comp_score_thread 1, coinp_score_thxead2, etc.).

At step 1404 the system applies a weighting/combining function F which operates on the participant-based metrics for each participant (comp_score_participant1s etc.) and the thread-specific metrics for the threads 1 through N where the participant is involved (comp_score_thread1, . . . , comp_score_tbreadN) where function F for participant X is defined as:

F((compj3corejparticipantX), (comp_score_thread1), . . . ? (comp_score_threadN))

At step 1405 the system uses the value of F for each participant to determine the size of the circle for that participant. At step 1406 the system connect all the participants with lines between participants that have connections, putting the biggest circles in the middle of the various clusters in the social graph.

Figure 16:
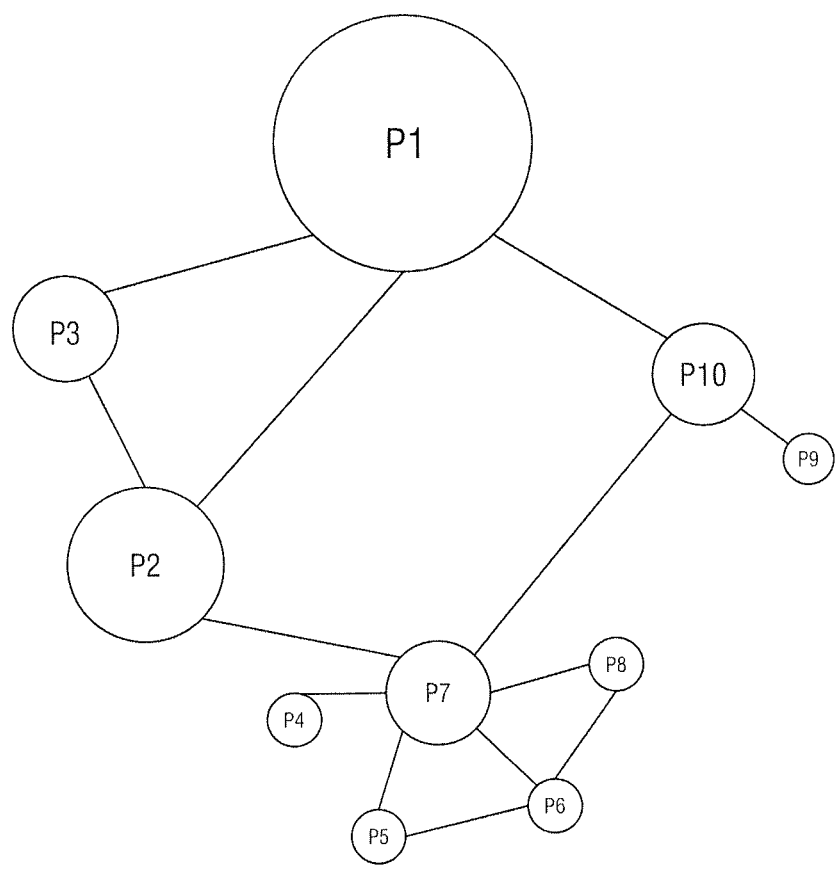
FIG. 16 is an example of a social graph.

FIG. 16 is an example of a social graph that may be used in this embodiment of the system. Each circle represents a user (e.g, P1 to P10). The size of the circle representing each participant represents both number of connections and attributes of the participant. In the example illustrated, even though participant P7 has more connections, participant PI has a larger circle due to the contribution of the attributes of participant PI.

Adaptive Relevancy

The system in one embodiment employs a technique referred to herein as "adaptive relevancy" to aid in fine tuning search results based on a constrained and bounded snapshot of the user's history and activity.

Currently, search engines compute which document is the most relevant for a given user query string. Relevancy is usually defined by a number of metrics and mathematical models to provide a score for the document which matches the users query. At that point the search results are returned in order of the highest score first. Over the past few decades there has been considerable research in tuning search engine relevancy. This research has generally yielded some standard approaches.

When talking about search engine relevancy one metric is TF-IDF relevancy. This abbreviation stands for "Term Frequency*Inverse Document Frequency". At a high level, this says; "More common words are less important when computing relevancy". For example, consider a query containing two terms; "the search". In the English language the word "the" is one of the most common terms that exists. The word "search" is much less common than the word "the'. So when computing a relevancy score for this query, the importance of the word "the" is less than the importance of the word "search". "TP" (term frequency) is how many times the relevant term shows up in a found document. "IDF" is the logarithm of how many documents in the entire corpus contain that word.

One problem with TF/IDF relevancy scoring is that documents that contain more content tend to get a better score because there is more text. One approach to offset this effect is to have a field length normalization factor in which the goal is to give shorter documents an equal playing ground to their longer counterparts.

Field or Contextual boosting allows the relevancy to be based on not only which terms matched and how frequently those terms matched in the document, but also says that if the term appears in a field such as the "title" field this is more important than a match in the "text" field. This field boosting is a way of specifying which fields contain better data to match on, and that if a match occurs on a field that is considered important, that the relevancy score should reflect that.

Another search strategy is used, for example, in a news search application. When indexing a news feed there is no external linking that is going on and a page rank model can't be applied. For news applications "freshness" is used as a metric. Freshness is a measure of how old the news article is. The idea is that more recent news is generally what people are looking for and therefore more relevant.

For local search applications, yet another metric for relevancy which is useful is distance to that result. If the documents contain a latitude and longitude value there is the ability to compute how far away that thing is from a point of reference by using the Haversine calculation (also known as the great circle calculation). This is an equation which computes the distance between two points on a curved surface such as a planet.

Another approach that some search engines have employed is referred to as proximity. Proximity only applies to multi term queries. Proximity is an additional boost to a relevancy score that is based on how close to each other the terms the user is searching appear in the text of the document. From the original example query of "the search": documents where the words "the" and "search" appear close to each other are more relevant that documents where the first term occurs on the first page and the second term occurs a hundred pages later. That is, if the terms that a user is searching for occur closer to each other, this is a sign that the document is more related to what the user is looking for.

In one embodiment, the system uses an adaptive relevancy scheme to provide greater precision and relevancy to searches performed on data in the system. In one embodiment, the system computes static rank scores for threads which can be indexed and added to the thread records. A relevancy model can be configured to include the values in this static rank score to help influence the relevancy of the documents that come back. Some basic tuning may be done to make sure that the fields on which the system is boosting the queries exist in the result set and are what are expected. Thus, a match on the message subject is likely more important than the match on the message body, also an exact match on a message's participants should be considered more relevant than just matching the person's name in a chunk of text.

In another embodiment, the system tracks a number of searches over some time period. Those searches are used as boost queries to generate results which are not only related to what the user is currently searching for, but also potentially boost documents which are related to things the user has searched for in the past. This provides a level of adaptive relevancy which is personalized to the user who is currently interacting with the system.

The system tracks a user search history to influence the relevancy of the current search. As a user runs searches, those searches are tracked. Tracking these searches produces a search profile. This search profile provides biases to how the relevancy for a given document in a search result set is computed. This occurs dynamically and creates a custom algorithm for how the search results are returned to each user as they use the system more.

The idea is that a users' previous search history is used to help boost documents that are returned for any given search. If a user searches for "A" in a first search then the user searches for "B" in a second search, the documents that match "B" will be returned, but the documents that also matched "A" will appear higher in the search result set.

If a user now searches in a third query for "C", the documents that match "C" will be returned. Documents that match term "B" will be boosted in the result set more than documents that matched term "A". The older in the users search history the query term is, the less impact it has on the ordering of a users' result set.

The more often a user searches for a term, the more that term will influence the search result and subsequent searches. If a user is researching in a particular area, they may search for many different terms. Each of these different terms will be related to the area of research. The key is to not restrict the result set by searching for all of the terms, but rather to influence how the relevancy is calculated to create a dynamic and adaptive relevancy profile that is tuned for a specific area of research.

The length of history that we can track can be as short or as long, or as specific as desired. The system can track the past 10 searches for a user, or the past 10 million (or more) searches. The system can also track the user's history on a session-by-session basis (each time they log on or off), or on a case-by-case basis (keep track of a user's history for separately for each lawsuit an attorney is working on), Additionally, if the user is working on several cases, store search data for Session 1 involving Case 1, then in Session 2 go to Case 2 and store that data, then in Session 3 go back to Case 1 and recall/embellish data that was stored in Session 1, then in Session 4 go back to case 2 and recall/embellish data that was stored in Session 2

FIG. 15 is a flow diagram that illustrates an embodiment of adaptive relevancy in the system. At step 1501 a search is initiated. At step 1502 the search is performed and results are returned, at step 1503 it is determined if there have been prior searches that can be used for adaptive relevancy. If so, the system proceeds to step 1504 and the search terms from prior searches are weighted according to their temporal relevance or some other metric. That is, search terms from more recent searches are given a higher weight or priority than from older searches. As noted above, the number of prior searches to be used for the adaptive relevancy is variable and may be any number, including cumulative from the entire history of the user, of from a particular session or number of sessions, or may be constrained to an account or associated matter if the user has identified an account for the search.

At step 1505 the search results are sorted. The sorting includes the weighted search terms if prior searches are available at step 1503. If not, the results are sorted based solely on the search terms from step 1501. At step 1506 the results are presented to the user. At step 1507 the search terms are added to the adaptive relevancy history so that they may be used in future searches.

In one embodiment the system stores data for separate files or cases. For example, consider a user working on cases at different times, where each time is considered a session for that case. The system will store data for Case 1, Session 1. At Session 2, the user is working on Case 2, If, at Session 3, the user returns to Case 1, then the system will recall the data from Session 1 because it is associated with Case 1. The system will not accumulate the data from Session 2 because it is associated with Case 2. Similarly, if in a Session 4 the user switches back to Case 2, the system will pull in data from Session 2 and not use the data from Sessions 1 and 3. This embodiment may be enabled or disabled by the user as desired.

In another embodiment, the system would also take into account opposites, such as de-emphasizing messages with a positive sentiment when the session history indicates the user is searching for messages with a negative sentiment. It would also take into account if a previous search in the session is for "NOT apple" (i.e. documents that do not contain "apple"), it would not emphasize documents later in the session that contain "•apple" and may, in fact, de-emphasize those documents that contain "apple".

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for sorting records of search results, comprising:
    receiving a search request comprising a set of one or more search terms corresponding to an area of research;
    performing a search of data in a system based on the set of one or more search terms of the search request, using adaptive relevancy and a relevancy model, to determine a set of the search results comprising one or more of said records that are relevant to the set of one or more search terms, wherein said adaptive relevancy comprises term frequency, inverse document frequency, relevancy, whether a term is out of context, freshness of news, distance to result, and proximity of the search terms;
    determining whether one or more prior search requests were received prior to the search request, the one or more prior search requests comprising another set of one or more search terms;
    upon determining that one or more prior search requests were received, weighting the one or more records of the set of search results based on a weighting metric relative to the another set of one or more search terms, wherein said weighting metric comprises one or more of field length normalization, field boosting, temporal relevance, and said proximity, and wherein said proximity is an additional boost to a relevancy score that is based on how close to each other two or more search terms appear;
    displaying the one or more records of the set of search results, the one or more records of the set of search results sorted based on the relevance of the one or more records to the set of one or more search terms and the weighting metric;
    storing the search request and the one or more prior search requests in a first session corresponding to the area of research;
    receiving a second search request corresponding to another area of research;
    performing a second search of data in a system based on the second search request to determine a second set of search results comprising one or more records that are relevant to the second search request;
    weighting the second set of search results based on a second weighting metric;
    displaying the second set of search results, sorted based on the weight of the second set of search results; and
    storing the second search request in a second session.

2. The method of claim 1, further comprising storing the set of one or more search terms corresponding to an area of research to a database comprising the one or more prior search requests.

3. The method of claim 2, further comprising:
    receiving a second search request comprising a second set of one or more search terms;
    performing a second search of the data in the system based on the second set of one or more search terms of the second search request to determine a second set of search results comprising a second one or more records that are relevant to the second set of one or more search terms;
    weighting the second set of search results based on the weighting metric and the stored set of one or more search terms;
    display displaying a second set of weighted search results, sorted based on the relevance of the second one or more records, the weighting metric and the stored set of one or more search terms; and
    storing the second set of one or more search terms in the database.

4. The method of claim 3, further comprising:
    receiving a third search request comprising a third set of one or more search terms;
    performing a third search of the data in the system based on the third set of one or more search terms of the third search request to determine a third set of search results comprising a third one or more records that are relevant to the third set of one or more search terms;
    weighting the third set of search results based on the weighting metric, the stored set of one or more search terms, and the stored second set of one or more search terms;

displaying a third set of weighted search results, sorted based on the relevance of the third one or more records, the weighting metric, the stored set of one or more search terms, and the stored second set of one or more search terms; and storing the third set of one or more search terms in the database.

5. The method of claim 1, further comprising:

receiving a third search request corresponding to the area of research;

performing a third search of data in a system based on the third search request to determine a third set of search results comprising one or more records that are relevant to the third search request;

weighting the third set of search results based on the weighting metric and the one or more records of the set of search results; and displaying the third set of search results, sorted based on the weight of the third set of search results.

6. A system for sorting records of search results, comprising:

one or more processors operable to:

receive a search request comprising a set of one or more search terms corresponding to an area of research;

perform a search of data in a system based on the set of one or more search terms of the search request, using adaptive relevancy and a relevancy model, to determine a set of the search results comprising one or more of said records that are relevant to the set of one or more search terms, wherein said adaptive relevancy comprises term frequency inverse document frequency relevancy, whether a term is out of context, freshness of news, distance to result, and proximity of the search terms;

determine whether one or more prior search requests were received prior to the search request, the one or more prior search requests comprising another set of one or more search terms;

upon determining that one or more prior search requests were received, weight the one or more records of the set of search results based on a weighting metric relative to the another set of one or more search terms, wherein said weighting metric comprises one or more of field length normalization, field boosting, temporal relevance, and said proximity, and wherein said proximity is an additional boost to a relevancy score that is based on how close to each other two or more search terms appear;

display the one or more records of the set of search results, the one or more records of the set of search results sorted based on the relevance of the one or more records to the set of one or more search terms and the weighting metric;

store the set of one or more search terms corresponding to an area of research to a database comprising the one or more prior search requests;

receive a second search request comprising a second set of one or more search terms;

perform a second search of the data in the system based on the second set of one or more search terms of the second search request to determine a second set of search results comprising a second one or more records that are relevant to the second set of one or more search terms;

weight the second set of search results based on the weighting metric and the stored set of one or more search terms;

display a second set of weighted search results, sorted based on the relevance of the second one or more records, the weighting metric and the stored set of one or more search terms; and store the second set of one or more search terms in the database.

7. The system of claim 6, wherein the one or more processors are further operable to:

receive a third search request comprising a third set of one or more search terms;

perform a third search of the data in the system based on the third set of one or more search terms of the third search request to determine a third set of search results comprising a third one or more records that are relevant to the third set of one or more search terms;

weight the third set of search results based on the weighting metric, the stored set of one or more search terms, and the stored second set of one or more search terms;

display a third set of weighted search results, sorted based on the relevance of the third one or more records, the weighting metric, the stored set of one or more search terms, and the stored second set of one or more search terms; and store the third set of one or more search terms in the database.

8. One or more computer-readable non-transitory storage media embodying software that is operable when executed to:

receive a search request comprising a set of one or more search terms corresponding to an area of research;

perform a search of data in a system based on the set of one or more search terms of the search request, using adaptive relevancy and a relevancy model, to determine a set of search results comprising one or more records that are relevant to the set of one or more search terms, wherein said adaptive relevancy comprises term frequency inverse document frequency relevancy, whether a term is out of context, freshness of news, distance to result, and proximity of the search terms, and wherein said proximity is an additional boost to a relevancy score that is based on how close to each other two or more search terms appear;

determine whether one or more prior search requests were received prior to the search request, the one or more prior search requests comprising another set of one or more search terms;

upon determining that one or more prior search requests were received, weight the one or more records of the set of search results based on a weighting metric relative to the another set of one or more search terms;

display the one or more records of the set of search results, the one or more records of the set of search results sorted based on the relevance of the one or more records to the set of one or more search terms and the weighting metric;

store the search request and the one or more prior search requests in a first session corresponding to the area of research;

receive a second search request corresponding to another area of research;

perform a second search of data in a system based on the second search request to determine a second set of search results comprising one or more records that are relevant to the second search request;

weight the second set of search results based on a second weighting metric;

display the second set of search results, sorted based on the weight of the second set of search results; and store the second search request in a second session.

9. The media of claim 8, further embodying software that is operable when executed to store the set of one or more search terms corresponding to an area of research to a database comprising the one or more prior search requests.

\* \* \* \* \*